United States Patent
Ahlberg et al.

(10) Patent No.: US 6,587,836 B1
(45) Date of Patent: Jul. 1, 2003

(54) AUTHENTICATION AND ENTITLEMENT FOR USERS OF WEB BASED DATA MANAGEMENT PROGRAMS

(75) Inventors: Axel H. Ahlberg, Colorado Springs, CO (US); Allyn P. Becar, Colorado Springs, CO (US); Gregory L. Brand, Colorado Springs, CO (US); Douglas B. Fenley, Colorado Springs, CO (US); Chester L. Jones, Colorado Springs, CO (US); Robert E. Wyrick, Colorado Springs, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,408

(22) Filed: Sep. 24, 1998

Related U.S. Application Data
(60) Provisional application No. 60/060,655, filed on Sep. 26, 1997.

(51) Int. Cl.⁷ ................................. G06F 17/60
(52) U.S. Cl. .................. 705/26; 379/201; 379/900; 709/225; 707/1; 707/10
(58) Field of Search ............... 705/26, 27; 379/201, 379/372, 900; 709/225; 707/121; 345/713, 741–743, 853

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |

(List continued on next page.)

FOREIGN PATENT DOCUMENTS

| | | | | |
|---|---|---|---|---|
| EP | 0 809 387 A2 | | 5/1997 | |
| JP | 09064870 A | * | 3/1997 | ............ G06F/1/00 |
| WO | WO 97/11443 | * | 3/1997 | ............ G07F/7/10 |
| WO | WO 97/16911 | | 5/1997 | |
| WO | WO 97/23988 | | 7/1997 | |
| WO | WO 98/19472 | | 5/1998 | |
| WO | WO 99/01826 | | 1/1999 | |

OTHER PUBLICATIONS

Meteorology; Databases, "Inforonics offers controlled access to Web Meteorology", Information Today, Apr. 1997, vol. 14 Issue 4, p53, 2p. This article reports that Inforonics has developed a controlled access gateway to MGA (Meteorological and Geoastrophysica.*

Rosen, Michele, "BPCS steps into new millennium", Midrange Systems; Spring House; May 10, 1996. This article informs about new release of BPCS Client/Server Software as the most extensive upgrade of the product since 1980s. It incorporates onject tech.*

(List continued on next page.)

Primary Examiner—Wynn W. Coggins
Assistant Examiner—Yogesh Garg

(57) ABSTRACT

An Internet Web-based order entry and system administration system is provided for ordering and fulfilling a suite of Web enabled applications. The system includes a capability for enabling customers to order and administer via the Internet, service products running on back-end systems. The system further communicates with the/back-end systems for synchronizing data associated with the customers. The system also accepts and processes security requests from the front-end and back-end servers associated with the suite of Web enabled applications. The system is easily accessed and invoked from a generic, off-the-shelf Web browser and at the same time a system infrastructure is provided that enables the secure initiation of order entry and system administration to customers from any computer terminal having a browser located anywhere in the world.

25 Claims, 24 Drawing Sheets

U.S. PATENT DOCUMENTS

| | | |
|---|---|---|
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A * | 5/1994 | Yamakawa ................. 707/1 |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A * | 7/1997 | Daley ................. 370/259 |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A * | 12/1997 | Reisman ............... 395/200.9 |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | De Witt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagel et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,694 A | 8/1998 | Rogers et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A * | 9/1998 | Teper et al. ........... 395/200.59 |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A * | 12/1998 | Burke ..................... 705/27 |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A * | 9/1999 | Hartman et al. ............ 705/26 |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |

| | | |
|---|---|---|
| 5,983,350 A | 11/1999 | Minear et al. |
| 5,991,733 A | 11/1999 | Aleia et al. |
| 5,991,746 A | 11/1999 | Wang |
| 5,991,806 A | 11/1999 | McHann, Jr. |
| 5,999,525 A * | 12/1999 | Krishnaswamy et al. ... 370/352 |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,049,789 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,072,493 A * | 6/2000 | Driskell et al. ............. 345/356 |
| 6,073,105 A | 6/2000 | Sutcliffe et al. |
| 6,073,122 A * | 6/2000 | Wool ........................... 705/51 |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A * | 9/2000 | Brown ........................ 370/256 |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A | 10/2000 | Voit et al. |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. .................. 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,337,858 B1 | 1/2002 | Petty et al. |
| 6,377,993 B1 | 4/2002 | Brandt et al. |
| 2001/0001014 A1 * | 5/2001 | Akins, III et al. .......... 380/241 |

OTHER PUBLICATIONS

Kenney, Kathleen, "American Management Systems launches Internet–based customer care and billing tool for telecom firms", PR Newswire; New York; Oct. 9, 1996, extracted from http://proquest.umi.com on Internet on Feb. 28, 2002.*

Morgan, Rick, "When used right, Internet can be effective marketing tool", Madison Capital Times; Madison, Wis; Nov. 8, 1996, extracted from http://proquest.umi.com on Internet on Feb. 28, 2002.*

Morris Edwards, "The electronic commerce juggernaut", Communications News; Nokomis; Sep. 1997, vol. 34, issue 9, extracted from http://proquest.umi.com on Inernet on Feb. 28, 2002.*

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/new/pressrel/pr$_{13}$ro7$_{13}$unveil.html.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Anonymous "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Quadri et al., Hewlett–Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," © Jul. 1998 and "Release Notes for Netflow FlowAnalyzer Release 1.0" © Sep. 1997.

HP Invent, "Capturing the Usage Billing Advantage", Copyright 1994–2001, Hewlett Packard http://www.hp.com/communications/usage/infolibrary/whitepapers/dsforum print.html.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self-Service' Help Desk Web Suite Makes PCs Help Desk-Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages",*UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

"New software platform enhances network management capabilities . . . ", *Business Wire*, Sep. 28, 1995, p. 9281122.

"User's Guide: Microsoft Access", Microsoft Corporation, 1994, pp. 378,594,599, 630–632 (13).

Jainschigg, J., "Billing confirmed: this easy-to-use box turns guest calls into revenue." *Teleconnect*, vol. 12, No. 9, p. 39(4).

Chapman, D. Brent et al., "Building Internet Firewalls", Nov. 1995, O'Reilly & Associates, p. 58.

He, Taniguchi, "Internet Traffic Control and Management Architecture", IEEE, Oct. 24–24, 1998, pp. s46–03–1–s46–03–5.

Sixth International Conference on Network Protocols, IEEE, Technical Communication Services, 13–16 Oct. 1998, Table of Contents.

Markovich, Robert, "WAN Service Level Management Could Keep Your Feet Out of the Fire, Ensure Carriers Dilligence", Network World, Jul. 7, 1997.

* cited by examiner

MCI
Customer Applications Support
2424 Garden of the Gods Road
A3-718
Colorado Springs, CO 80919

June 1, 1998

Bryan Fenley
MCI
2424 Garden of the Gods Road
Colorado Springs, CO 80919

Enterprise ID: 10379339

Dear networkMCI Interact℠ Subscriber,

Welcome to networkMCI Interact. Now you have everything you need to monitor and manage your company's MCI services via the World Wide Web.*

To access networkMCI Interact's integrated suite of applications, you must have Internet access. For your convenience, we are sending you Internet access software under separate cover in case you currently do not have an Internet Service provider.

Because you are a networkMCI Interact Subscriber, we are offering you FREE unlimited local Internet access when you register for networkMCI Internet℠ - a savings of $19.95 per month! Each month, this amount will appear on your invoices as a full credit. In addition 800/888 toll-free access is also available at the rate of $5.95 per hour. When you receive your networkMCI Internet CD-ROM package, simply refer to the Getting Started Guide for instructions on how to install and register for networkMCI Internet.**

Once you have access to the Internet, you must log-on to the networkMCI Interact Web site, https://www.interact.mci.com, using the personal User ID and Temporary Password listed below.

LOG-ON INFORMATION

UserID: tollfree
Temporary Password: password

When you first log-on to the networkMCI Interact home page, instructions will be provided for personalizing your password. Also, for more information pertaining to the applications you have ordered, simply go to the Message Center located on the networkMCI Interact home page.

If you have questions or need technical support for networkMCI Interact, please call 1-800-326-2775. For networkMCI Internet technical support, please call 1-800-326-2775. For a complete listing of applications available through networkMCI Interact, please contact your MCI account representative.

Thank you for choosing networkMCI Interact.

Sincerely,

Ronald J. McMurtrie
Vice President, Product, Local, and Global Marketing

*MCI's Internet browser utilizes Microsoft Internet Explorer which is a registered trademark of Microsoft Corporation in the United States and/or other countries.
**If you choose to use a browser other than networkMCI 4.01 or Microsoft Internet Explorer 4.01, we cannot guarantee the performance of, or provide technical support for that software.

FIG. 8

New/Modify User

- Requested User ID:
- First Name:
- Company:
- Street 1:
- Street 2:
- City:
- State:
- Postal Country: United States
- Postal/Zip Code:
- Phone:
- Language: English
- Time Zone: (GMT-07:00) Mountain Time (US & Can
- Access Method: ○ Dial-up  ○ Frame Relay  ○ ISDN
- Location:
- Sales City:
- Department:

Password: zogehiwa  ☐ New?
Last Name:

[Application Setup] *524a*  [Submit] *524b*  [Cancel] *524c*

*520*

Applet Viewer: userinfo.class
Applet

FIG. 20

AUTHENTICATION AND ENTITLEMENT FOR USERS OF WEB BASED DATA MANAGEMENT PROGRAMS

CROSS-REFERENCE TO RELATED APPLICATIONS

The following patent application claims the benefit of U.S. Provisional Patent Application Ser. No. 60/060,655 filed Sep. 26, 1997.

BACKGROUND OF THE INVENTION

1. Field of the Invention

The present invention relates in general to application software, and more specifically to Web-based system administrative software servicing local and a remote suite of applications in a communications network.

2. Background Art

System administrative software is generally known in the information systems industry. This type of software normally provides functions for adding and deleting users, file system management such as backups and version controls, and user security control. The system administrative functions provided by the known software, however, are usually limited to a specific computer platform or even a specific service product. For example, telecommunications service providers offer many different services which have been developed independently over time, and which operate on different computer platforms. Each of the applications associated with different services usually implements its own system administration functions for the related service product separately from the others. Thus, when a customer needs to order or perform administrative functions in more than one service product, the customer is forced to exit the first application before beginning an operation on the second application. Moreover, when using the second service product, the customer must then reenter some of the same information previously entered while using the first service product. Therefore, it is desirable to have a centralized order entry and system administrative infrastructure for handling common functions and associated data for a number of product services.

In addition, with the existing software, a customer support team interaction is usually necessary to complete the order entry and administrative process. Therefore, it is also desirable to have fully automated system administrative software, which automatically connects to the associated back-end systems and updates the back-end databases as necessary. Furthermore, the fully automated order entry system minimizes human intervention during the fulfillment processing for each order entry requested by a customer, resulting in cost and time savings.

In conventional systems, a connection is made with a large legacy system via a dial-up connection from a customer owned personal computer or workstation. This connection frequently, although not always, emulates a terminal addressable by the legacy systems. The dial-up access requires custom software on the customer workstation to provide dial-up services, communication services, emulation and/or translation services and generally some resident custom form of the legacy application to interface with the midrange or mainframe computer running the legacy system.

There are several problems associated with the approach. First, the aforementioned software is very hardware dependent, requiring multiple versions of software compatible with each of a wide range of workstations customers generally have. Therefore, extensive inventory for distribution becomes necessary. If the customer hardware platform changes through an upgrade, the software licensing issues must be renegotiated. Moreover, installing the software generally requires an intensive effort on the customer and the software support team before any reliable and secure sessions are possible.

Secondly, dial-up, modem, and communications software interact with each other in many ways which are not always predictable to a custom application, requiring extensive trouble shooting and problem solving for an enterprise desiring to make the legacy system available to the customer, particularly where various telephone exchanges, dialing standards or signal standards are involved.

Thirdly, although more businesses are turning to the Internet to improve customer service and lower costs by providing Web-based support systems, when an enterprise desires to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBCDIC language used by IBM, and the 127 ASCII character language used by contemporary personal computers. Therefore, an integrated and unified Web-based system for providing an access to a number of different legacy systems in one session is desired.

Finally, the security and entitlement features of the various legacy systems may be completely different, and vary from system to system and platform to platform. It is therefore, desired to provide connectivity to enterprise legacy systems over the public Internet, as the Internet provides access connectivity world wide via the TCP/IP protocol, without need to navigate various telephone exchanges, dialing standards or signal standards.

The popularity of the public Internet provides a measure of platform independence for the customer, as the customer can run their own Internet Web browser and utilize their own platform connection to the Internet to enable services. This resolves many of the platform hardware and connectivity issues in the customers favor, and leaves the choice of platform and operating system to the customer. Web-based programs can minimize the need for training and support since they utilize existing client software, i.e., a browser, which the user has already installed and already knows how to use. Moreover, there is no longer a need to produce and distribute voluminous hard copies of documentation including software user guides. Further, if the customer later changes that platform, then, as soon as the new platform is Internet enabled, service is restored to the customer. The connectivity and communications software burden is thus resolved in favor of standard and readily available hardware and the browser and software used by the public Internet connection.

An Internet delivered paradigm obviates many of the installation and configuration problems involved with initial setup and configuration of a customer workstation, since the custom application required to interface with the legacy system can be delivered via the pubic Internet and run within a standard Web-browser, reducing application compatibility issues to browser compatibility issues. The Web-based fully automated order entry system simplifies many of the fulfillment issues since the customers need not be provided with additional software and software user guides, other then a web browser.

For the enterprise, the use of off-the-shelf Web browsers by the customer significantly simplifies the enterprise burden by limiting the client development side to screen layout designs and data presentation tools that use a common interface enabled by the Web browser. Software development and support resources are thus available for the delivery of the enterprise legacy services and are not consumed by a need for customer support at the workstation level.

SUMMARY OF THE INVENTION

The present invention is to provide a Web-based, on-line application system for processing system administrative and order entry functions for an integrated suite of services and products over the Internet. For example, a suite of products and services may include personal communications services such as pagers, cellular phones, and voice mail, traditional wireline services, and Internet access. Other services include Toll Free Number Network and conferencing. Integrating these products and services and providing an online system for order entry and administration over the Internet allow improved flexibility to a customer when managing their telecommunications accounts. For instance, the customer may effect desired changes in their accounts, in real time and instantaneously, by utilizing the system of the present invention. Moreover, the customer may instantaneously order additional services over the Internet via the system of the present invention.

The present invention also handles the security and authentication requests from both the client and the server side of the applications implementing the suite of products and services. In this way, a single security profile may be maintained for a given customer, the security profile being included in a centralized database servicing the suite of disparate products and services.

Furthermore, the present invention provides a real time transaction capabilities for notifying the client and server sides of applications implementing the suite of products and services, of the modifications effected by the customer using the system of the present invention. Upon receiving the notifications, the applications may update their data with the modifications effected, such that all data maintained about the customer are kept synchronized at all times.

Additionally, the present invention includes a reconciliation process, which may be run periodically, for example, on a daily basis, for retrieving data from the mainframe database in order to refresh all data relating to customer information, such that the data stored in the present invention is kept up-to-date and synchronized with the mainframe system.

Moreover, the present invention provides a fulfillment process for notifying a fulfillment house of all new customers added to the system. The fulfillment house then may send a welcome package including subscription information to the new customers as necessary. The present invention also includes a billing process for directing billing information to different billing streams as desired by the customer.

The above features provided by the present invention are attained preferably with a Web-based centralized authentication and entitlement administration system for enabling a customer to enter orders over the Internet from a client terminal for one or more application services available at an enterprise Intranet. The system includes a client browser application running in a client workstation and providing an integrated interface to the one or more application services. The client browser application provides a graphical user interface for interacting with the customer. Additionally, an order entry server located at the enterprise Intranet is provided. The order entry server communicates over the Internet with the client browser application to provide authentication and entitlement information associated with the customer. The client browser application uses the authentication and entitlement information associated with the customer and applies the authentication information in validating the customer before enabling the customer to access the enterprise Intranet. The client browser application enables the customer to access only those application services to which the customer is entitled. An order entry object initiated via the client browser application is also included for enabling presentation of entry options for the customer, the entry options including adding a new order entry, modifying an existing order entry, and canceling an order entry. The order entry object further communicates customer entry of a specific entry option to the order entry server, thus allowing the customer to enter new orders, modify existing orders, and cancel orders for the application services within the customer entitlements via the integrated interface.

BRIEF DESCRIPTION OF THE DRAWINGS

Preferred embodiments of the present invention will now be described, by way of example only, with reference to the accompanying drawings in which:

FIG. 8 illustrates an example of a fulfillment letter send to a customer;

FIG. 20 illustrates an example of a new/modify users screen used for setting up new users or modifying options available to the existing users;

DETAILED DESCRIPTION OF THE PREFERRED EMBODIMENTS

An Overview of the Web-enabled Integrated System

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695 the nMCI Interact system architecture is basically organized as a set of common components comprising the following:

1) an object-oriented software architecture detailing the client and server based aspect of nMCI Interact;
2) a network architecture defining the physical network needed to satisfy the security and data volume requirements of the networkMCI System;
3) a data architecture detailing the application, back-end or legacy data sources available for networkMCI Interact; and
4) an infrastructure covering security, order entry, fulfillment, billing, self-monitoring, metrics and support.

Each of these common component areas will be generally discussed hereinbelow. A detailed description of each of these components can be found in a related, co-pending U.S. patent application U.S. Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
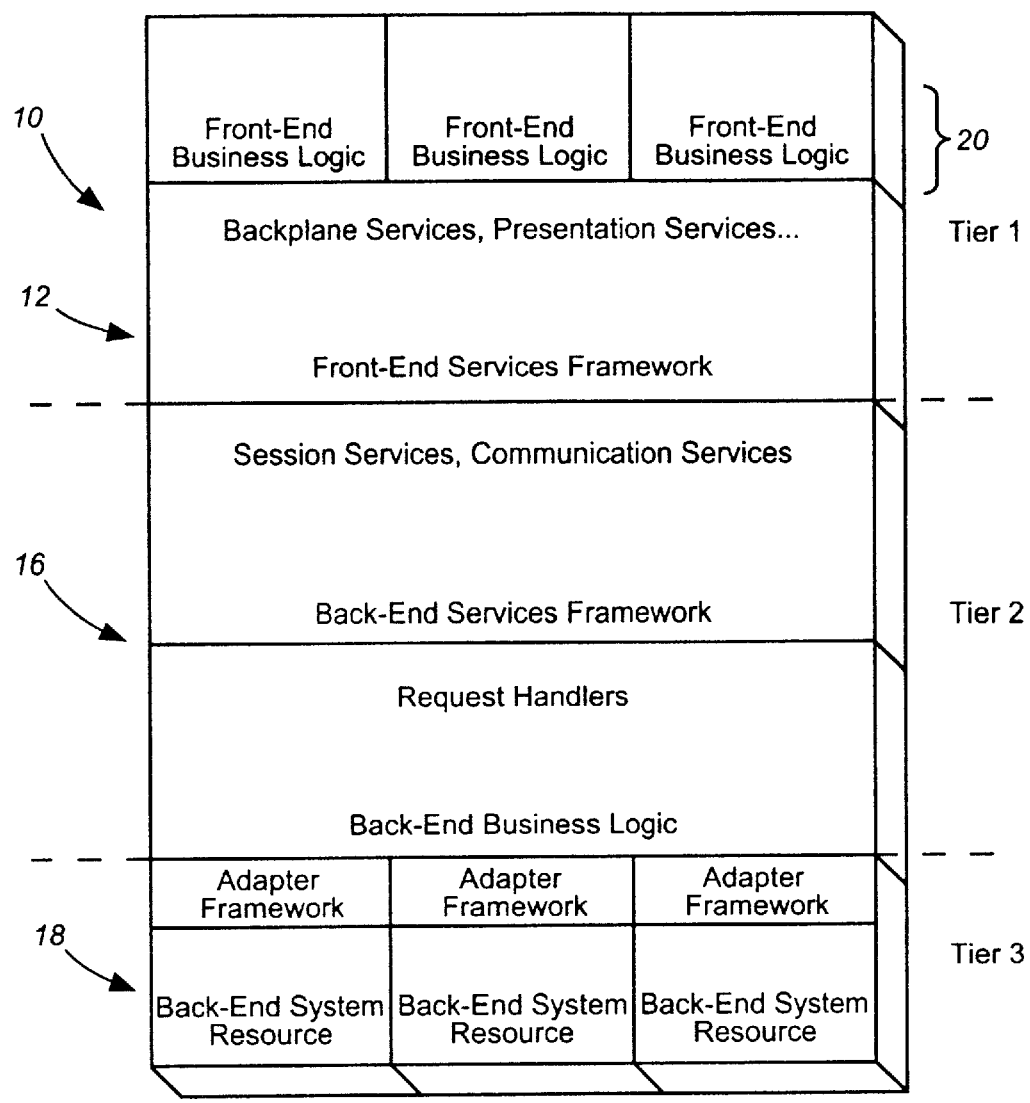
FIG. 1 illustrates the software architecture component comprising three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additional applications are directed to front-end services such as the presentation of data in the form of tables and charts, and data processing functions such as sorting and summarizing in a manner such that multiple programs are combined in a unified application suite.

A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as explained in co-pending U.S. patent application Ser. No. 09/159,515 now U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or call management functions. The system is capable of delivering to customers the functionality appropriate to their product mix.

Figure 2:
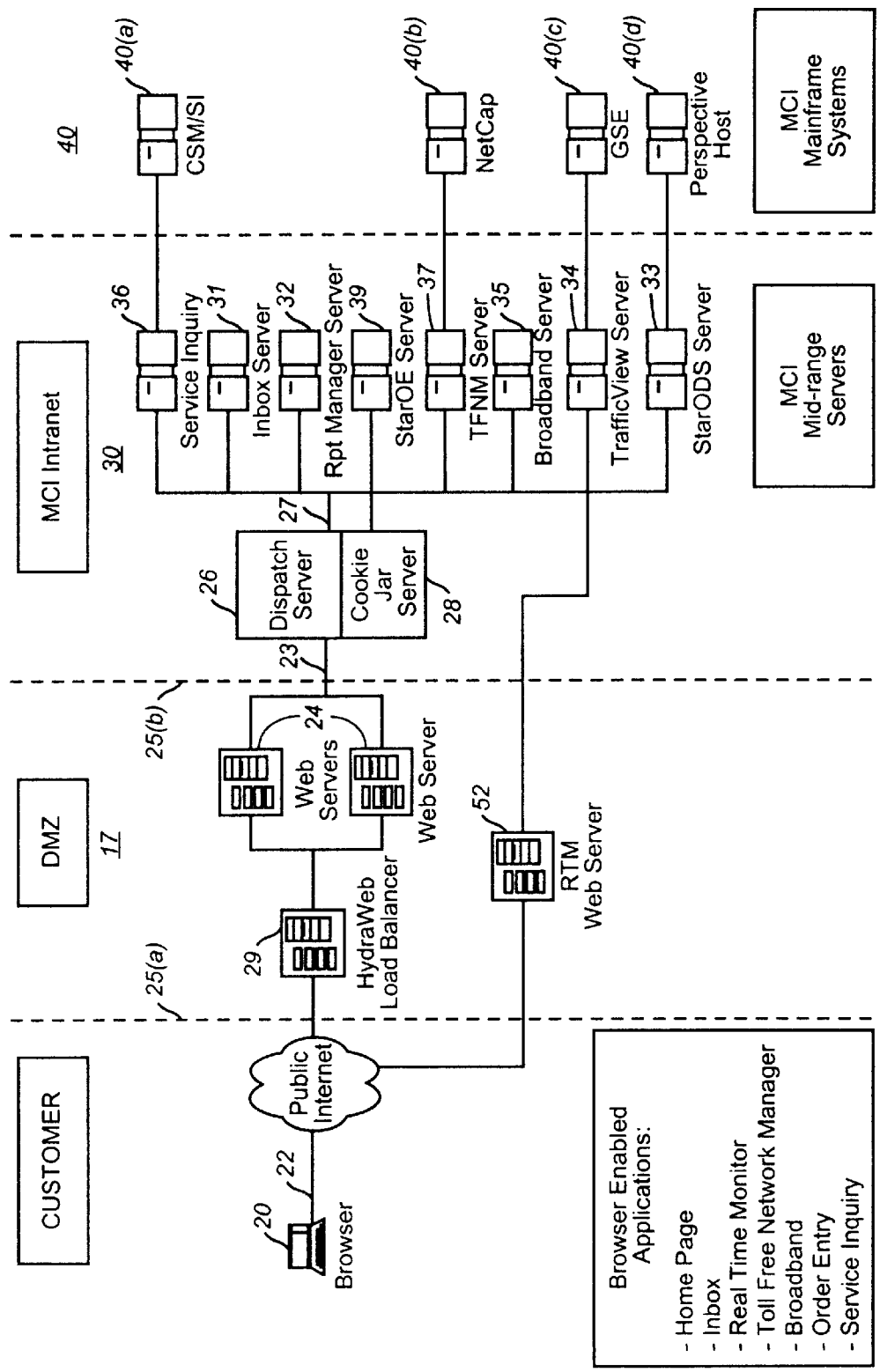
FIG. 2 is a diagrammatic overview of the software architecture the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
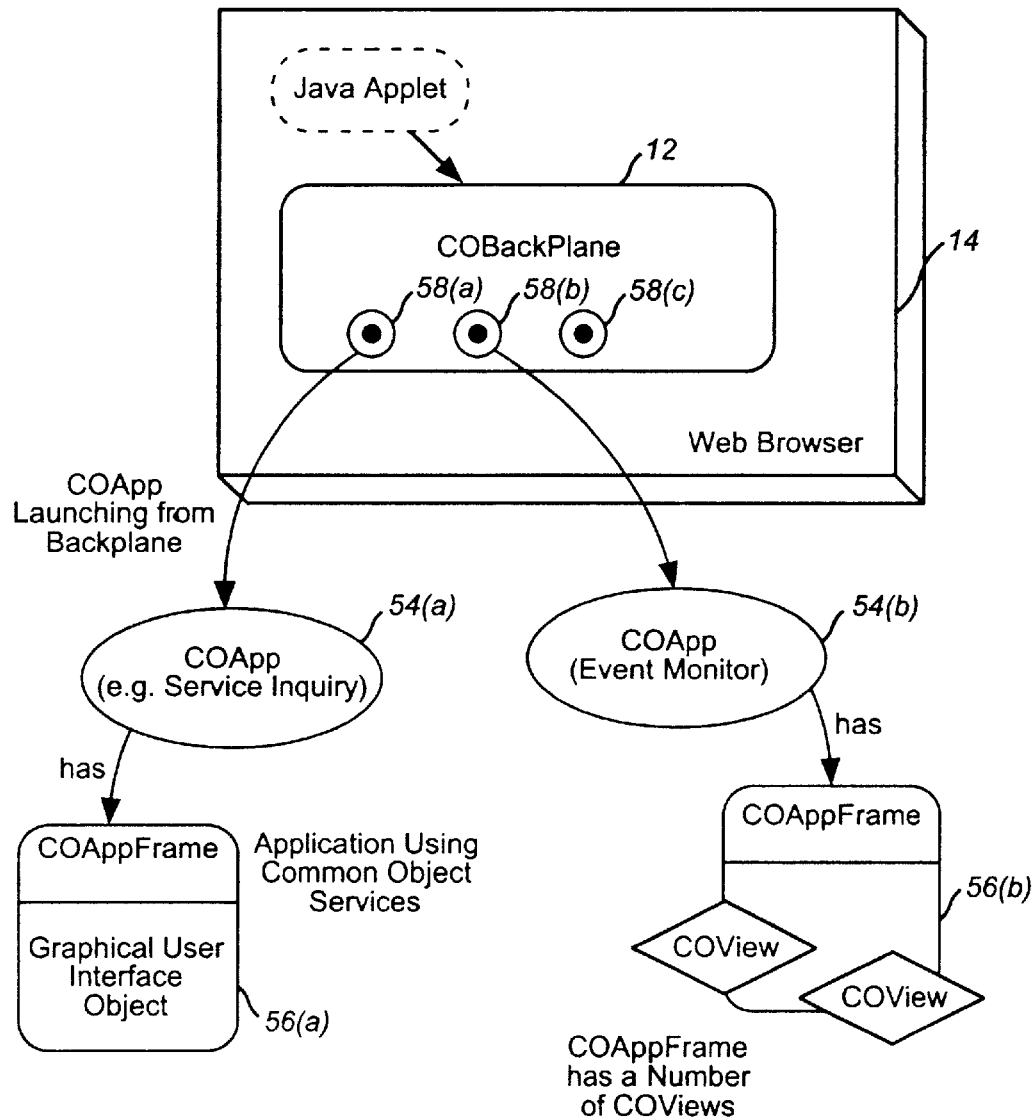
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The networkMCI Interact common set of objects provide a set of services to each of the applications. The set of services include: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture'scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG.3 as buttons 58a,b,c selectable by the user. As illustrated in FIG. 3, upon selection of an application, the backplane 12 launches that specific application, for example, Service inquiry 54a or Event Monitor 54b, by creating the application object. In processing its functions each application in turn, may utilize common object services,provided by the backplane 12. FIG. 3 shows graphical user interface objects 56a,b created and used by a respective application 54a,b for its own presentation purposes.

Figure 4:
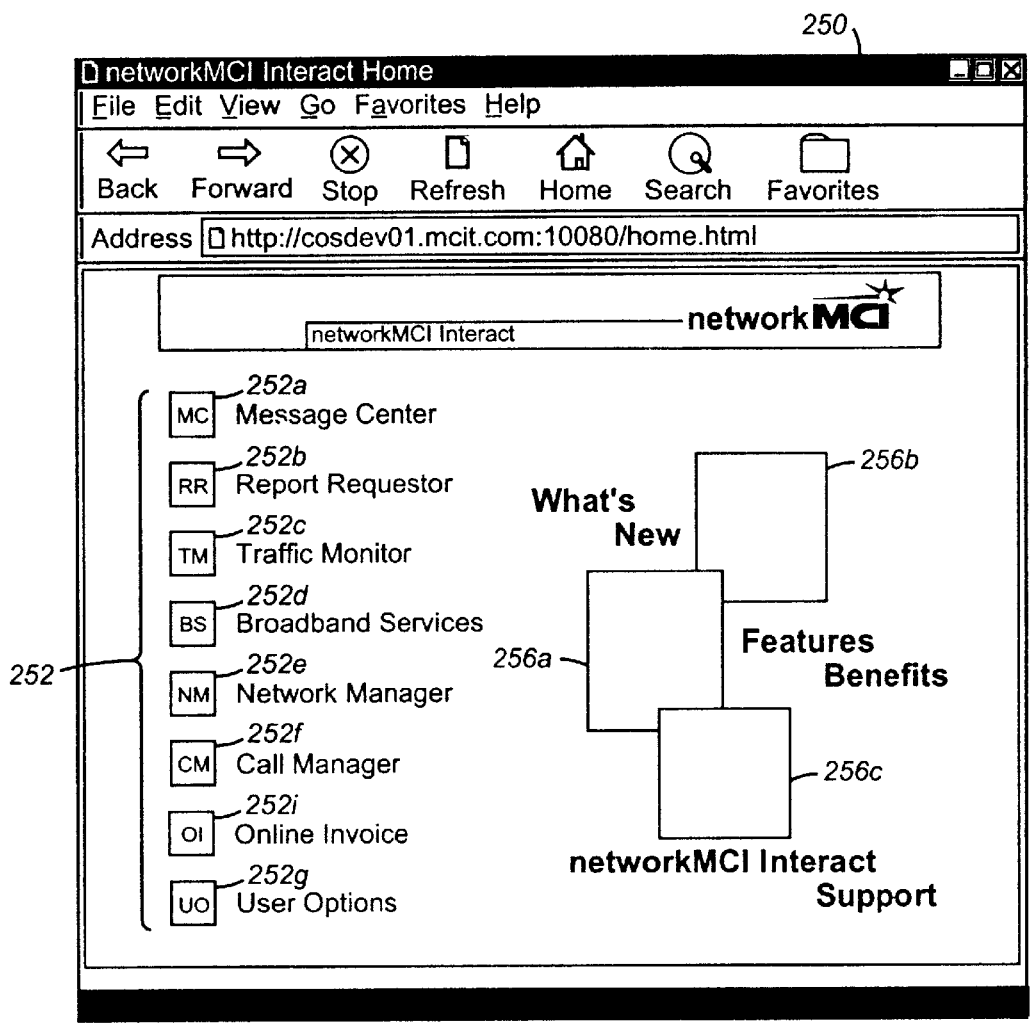
FIG. 4 illustrates an example client GUI presented to the client customer as a browser web page.

FIG. 4 illustrates an example client GUI presented to the client/customer as a browser web page 250 providing, for example, a suite 252 of network management reporting applications including: MCI Traffic Monitor 252c; Call Manager 252f; a Network Manager 252e and Online Invoice 252i. Access to network functionality is also provided through Report Requester 252b, which provides a variety of detailed reports for the client/customer and a Message Center 252a for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm, and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As described in greater detail in co-pending U.S. patent application Ser. No. 09/159,514 entitled SECURE CUSTOMER INTERFACE FOR WEB-BASED DATA MANAGEMENT, the contents and disclosure of which are incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49, the server component of the present invention, at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

AS partially shown in FIG. 2, it is understood that each Intranet server of suite 30 communicates with one or several consolidated network databases which include each customer's network management information and data. For example, the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
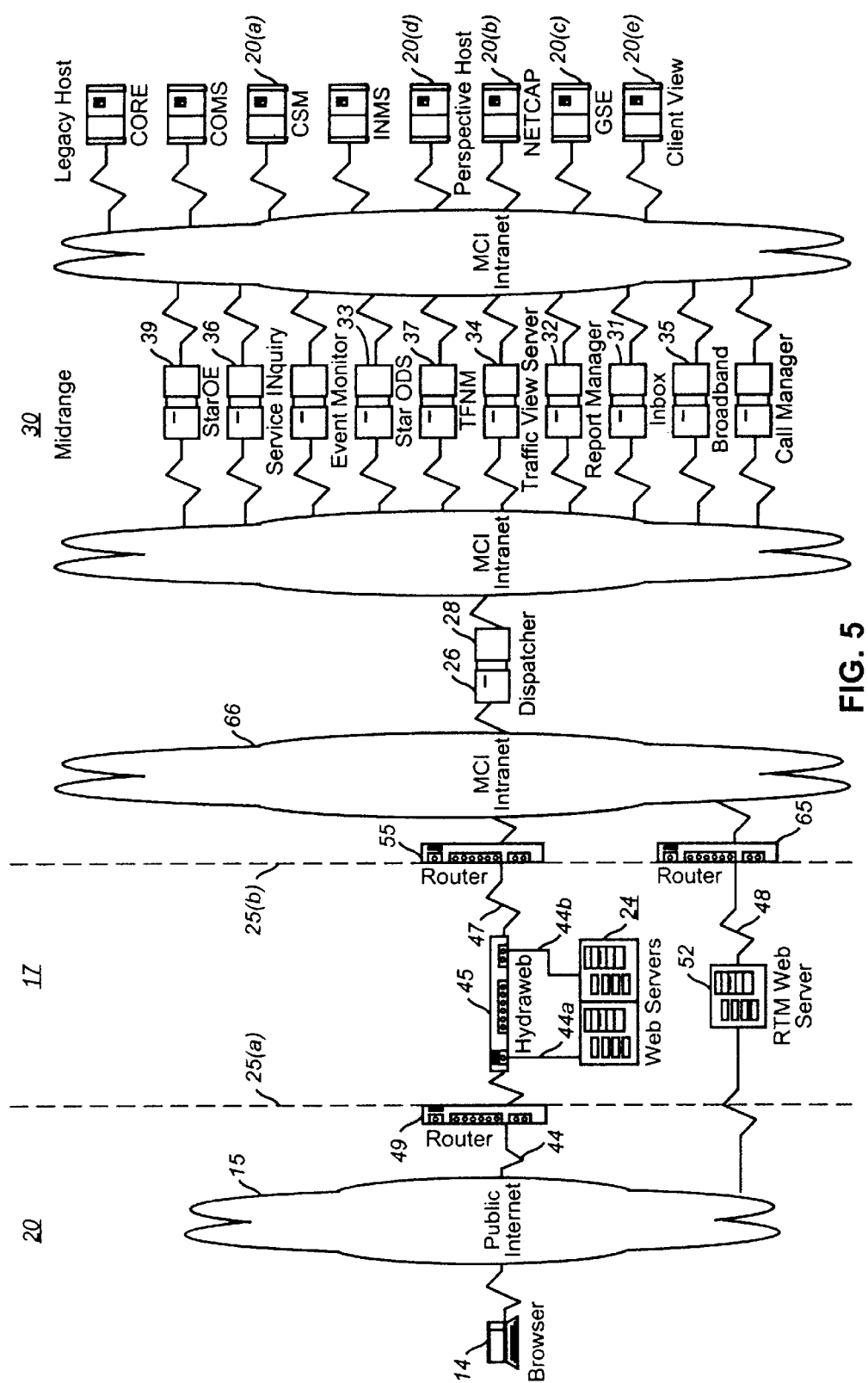
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back-end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWEB™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWEB™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the HydraWEB™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, entitled INTE-GRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWEB™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695 the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is generally resident in a Report Manager server database and managed by the report manager.

The Infrastructure component of the nMCI Reporting system includes mechanisms for providing secure communications regardless of the data content being communicated. As described in detail in above-referenced, co-pending U.S. patent application Ser. No. 09/159,514 the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the present invention, the Order Entry ("StarOE") service. The general categories of features to be ordered include: 1) Reporting, including inbound traffic standard, inbound traffic call detail, inbound traffic exception, inbound traffic real time monitor reports, priced reports, and priced call detail reports; 2) Broadband, including basic, standard, enhanced with SNMP, enhanced with adhoc, premium, dedicated SNMP, and dedicated SNMP with adhoc; 3) Toll Free Network Manager; and 4) Call Manager. The order entry functionality is extended to additionally support 5) Event Monitor; 6) Service Inquiry; 7) Outbound Network Manager; and, 8) Online invoicing.

The self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515 the client-tier software is organized into a "component" architecture supporting such applications as inbox fetch and inbox management, report viewer and report requester, TFNM, Event Monitor, Broadband, Real-Time Monitor, and system administration application. Further functionality integrated into the software architecture includes applications such as Outbound Network Manager, Call Manager, Service Inquiry and Online invoicing.

StarOE

The present invention is directed to a system administration and order entry component (StarOE) of the above described integrated suite of customer network management and report application, referred to as the "networkMCI Interact". The system of the present invention, the StarOE, is used to order, fulfill, and bill for, as well as administer, the suite of network applications, providing a horizontal service for use by all applications. The applications communicate to StarOE for all authentication, entitlement and system administration as well as order entry services. StarOE centrally processes these service requests for the individual applications by providing all order entry and security information for the "networkMCI Interact" suite of applications.

The security information which the StarOE maintains and provides describes identification, authentication and access control used in the suite of applications. All access to the "networkMCI Interact" is controlled by userids and passwords. In addition, individual users are specifically granted access to only the necessary system objects, i.e., file, programs, menus, reports, etc. Access to these individual objects are based upon the customer privilege models, referred to as entitlements, stored in a StarOE database. Thus, all information regarding customers and their access levels for each product in the suite of network applications to which the customers have subscribed are stored in a customer security profile database local to the StarOE. Accordingly, StarOE provides the ability to prevent unauthorized, non-customer access to "networkMCI Interact" data and applications; ability to allow customers to access multiple enterprises with one userid; ability to restrict authorized users to specific Intranet applications and databases based on applications ordered by the customer; and the ability for users to restrict view and/or update capabilities within an application or data set, i.e., customers may provide or restrict views of their "enterprise" data to subgroups within their organization.

By utilizing the system of the present invention, customers no longer have to place manual calls to order entry hubs when requesting order transactions. For example, users may be added to the system without an enterprise's support team intervention. In sum, customers may manage their communications services in a secure environment and also, for example, monitor their network traffic via the Internet, as well as have a capability to add products and services to their account, in an automated fashion and all in one session without having to enter and exit the individual application services separately, and without having to contact a customer support representative.

Figure 6:
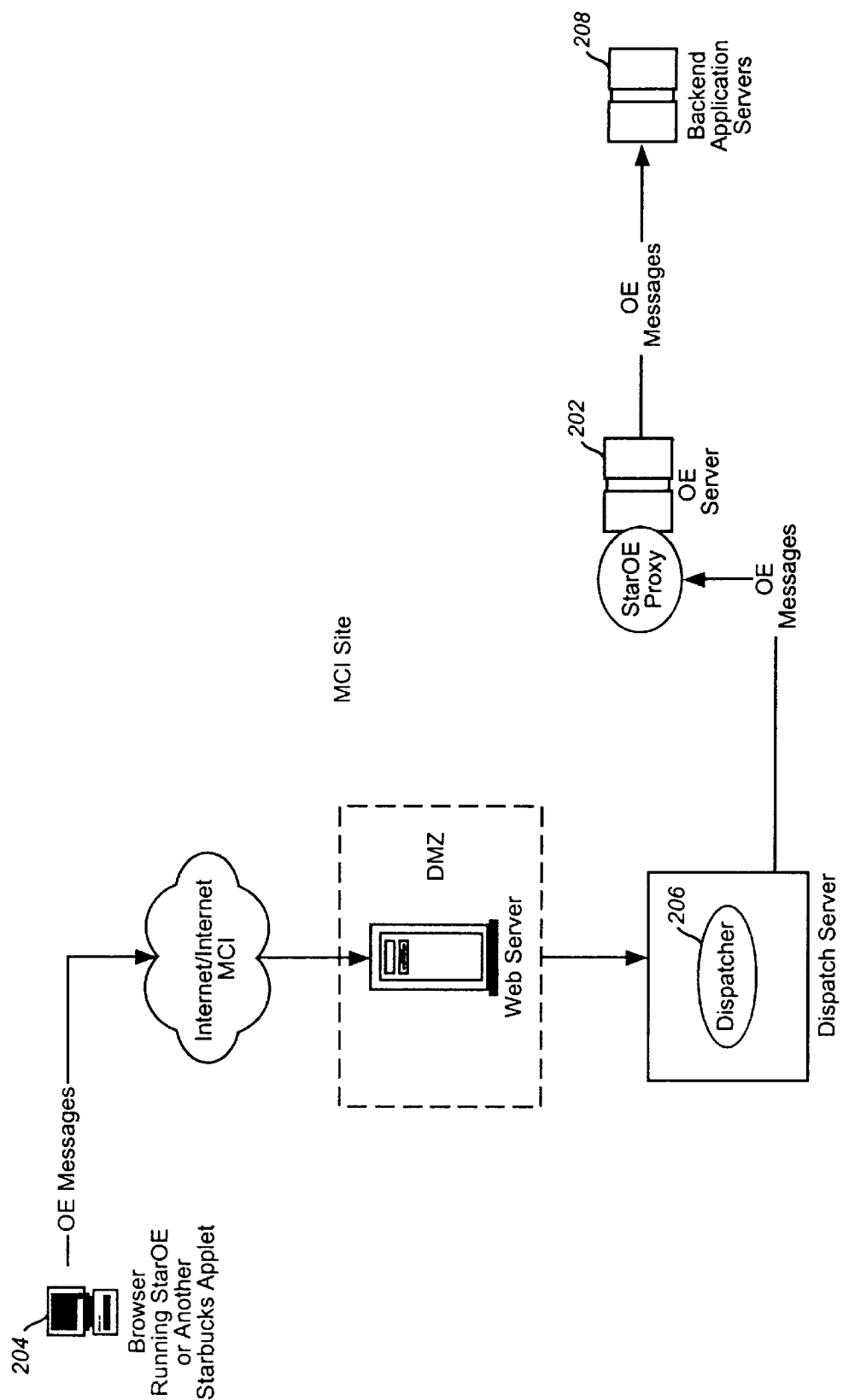
FIGS. 6 and 7 illustrate an architectural overview for the system of the present invention.
Figure 7:
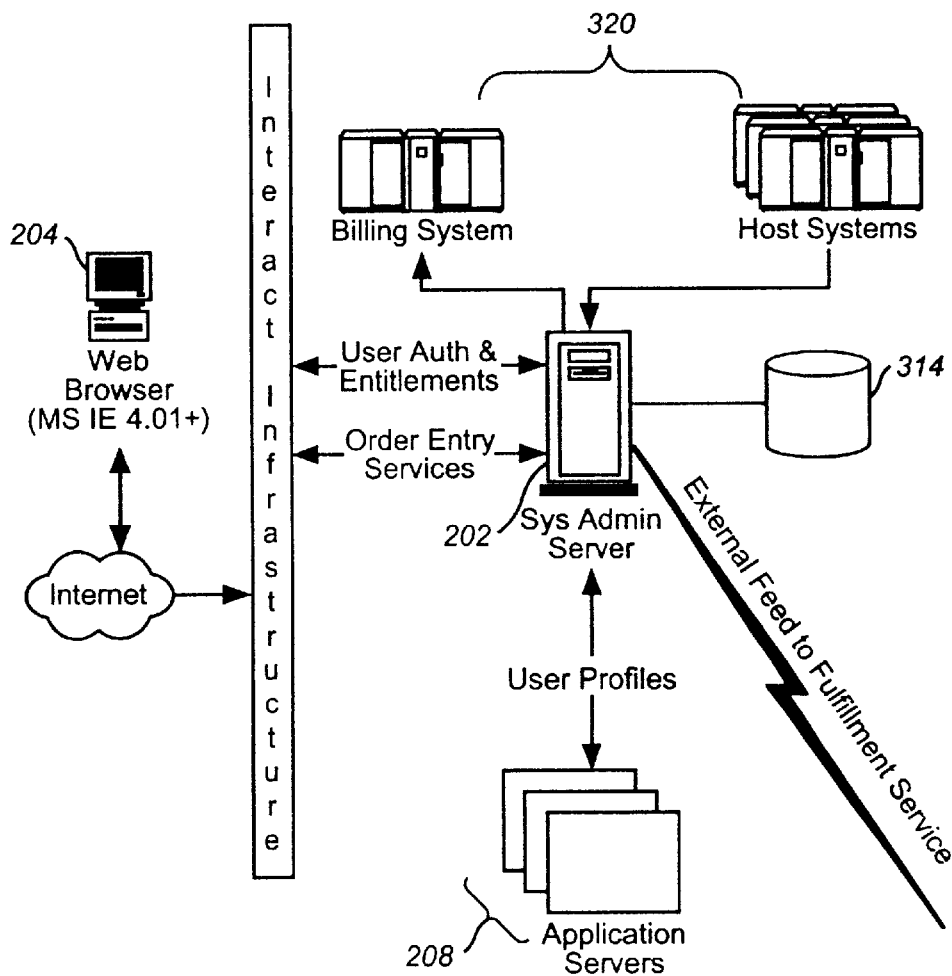

FIGS. 6 and 7 illustrate an architectural overview of the administration and order entry system of the present invention, i.e., StarOE. The StarOE includes a server 202 typically resident in a midrange computer, and a client application 204 running in a user platform having a Web browser, hereinafter referred to as a StarOE client application. The StarOE processes a number of transaction requests relating to authentication and entitlements, from other application services, both from the client and the server 208 sides of the network. In addition, the StarOE server 202 receives transaction requests from the StarOE client. The transactions are typically message driven and comprise requesting transactions and response transactions. The transaction messages will be described in detail in reference to FIG. 13. The StarOE server 202 responds to the requests by formulating transaction responses and transmitting them to the requesting servers and clients.

The StarOE Client Application

The StarOE client application 204 is typically a Web-based GUI interface running in a World Wide Web browser (Microsoft Internet Explorer 4.0.1 or higher), and implemented accordingly and conforming to a standard defined for the GUI interface for the integrated suite of customer network management and report applications ("networMCI Interact"). The client application's user interface is consistent with other products and services under the suite of network applications. Description of the GUI interface implementation standard can be found in the co-pending U.S. patent application Ser. No. 09/159,515.

The client browser application 204 generally includes a Web browser and Java applications and applets for providing a common Web-based GUI for interacting with customers at the front-end side. A backplane unit, a backbone for applications running in the client platform is typically launched as a Java applet from a Web page, i.e., the "networkMCI Interact" home page (FIG. 4). The StarOE client application may then be invoked from the home page by the backplane unit at customer's initiation.

Figure 18:
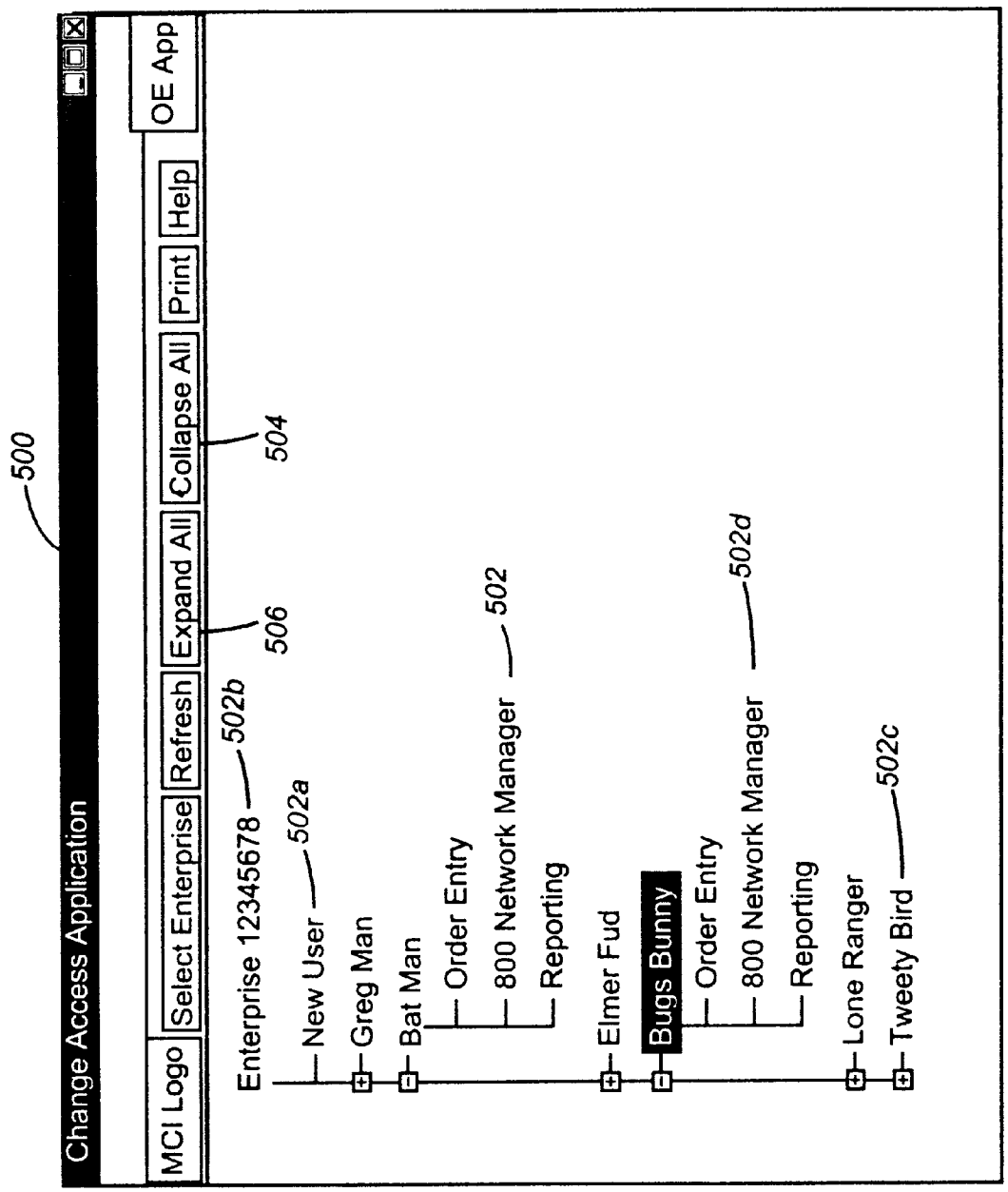
FIG. 18 is an example of a StarOE main window which is launched from the "networkMCI Interact" home page.

When a customer launches the StarOE application from the home page, the main window as illustrated in FIG. 18, is presented. From this main window 500, a customer may select to order and fulfill application services, request user id's, and create user security profiles for the "networkMCI Interact" suite of applications. The main window 500 includes a menu bar 506 with options to perform various StarOE tasks. The main window also includes a toolbar 504, common to all "networkMCI Interact" applications. The toolbar 504 has buttons that also perform the various StarOE functions. Typically, the user list is presented, i.e., displayed as a tree 502, within the main window 500.

The menu options 506 include: file menu options which includes a select enterprise option for allowing administrators to open a user list for a different enterprise, or add a new enterprise to their enterprise list, print option, and exit option which shuts down the StarOE application; edit menu option which includes add new application, modify, and delete options; options menu which enables a global security setup for the toll free manager application; view menu which includes options to refresh the screen by retrieving the latest user list for the opened enterprise from the StarOE server and displaying the list on the screen, to expand all nodes in the user list, and to collapse all nodes in the user list; and help menu option which launches the help engine with StarOE help text. The toolbar 504 also includes the options for a select enterprise, refresh, expand all, collapse all, print and help options.

A typical process flow logic for StarOE client application starts with the home page launching the StarOE client and passing a reference to a common user information object. This object includes the user id, and the default enterprise for that user. The main window 500 having the menu options 506 and the toolbar 504 is then presented. The StarOE client application then sends a "get StarOE security" message by including user id, enterprise id, and the StarOE application code in the message. The StarOE server 202 returns racf id, an access level representing whether the user is an external admin, a member of an account team, an internal admin, or a customer support admin, for example. If the user that launches the StarOE application is an external admin, the user list is displayed immediately since external administrators may view only one enterprise. For external administrators, an enterprise name is retrieved from the StarOE server 202 by sending and receiving a "get user enterprise list" transaction request and response.

If the user is not an external administrator, then a dialog is presented for the user to select which enterprise to view. When user selects an enterprise to view, a "get user list" message having enterprise id is sent to the StarOE server 202 to retrieve a list of user ids, a list of applications for each user, an access type for each application, and reporting types for StarWRS (e.g., Toll Free, Vnet, Vision, CVNS). The client application also sends a "get application list" message to retrieve from the StarOE server 202 a list of application codes, description, and an application array position. The user list is then displayed within the main window as shown at 502.

Every user list has a New User node 502a as the first node under an enterprise 502b. This node may be selected to order a new user. An existing user node 502c may be selected to edit and add new applications for that user. When an existing user node 502c is selected, the edit/add new application options on the menu 506 is enabled and disabled according to what applications the user already has. An existing user application node 502d may be selected to edit/modify/delete options within the application.

Figure 19:
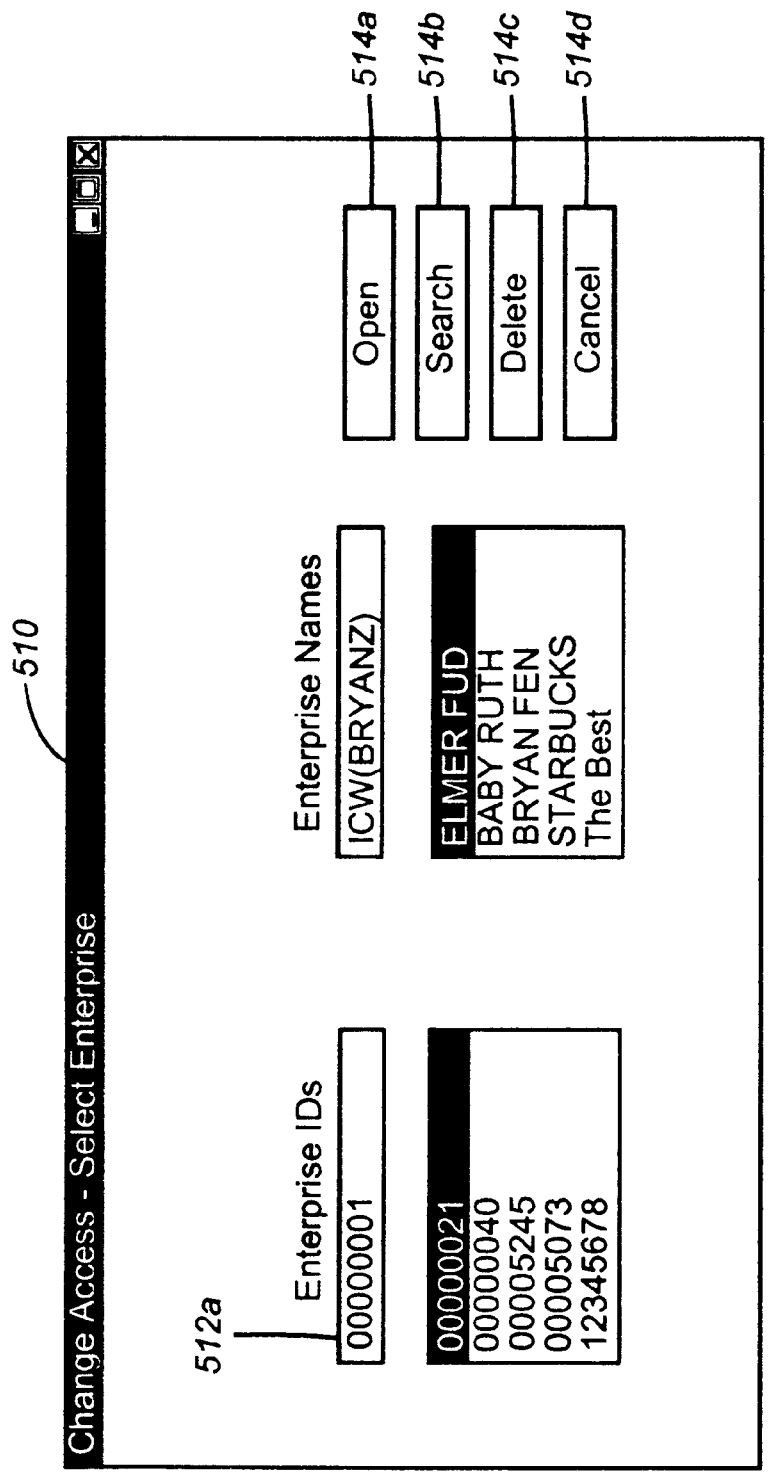
FIG. 19 illustrates a dialog box presented to a user from the StarOE main window for selecting an enterprise.

FIG. 19 illustrates a dialog box 510 presented to a user for selecting an enterprise. This dialog box is displayed when the user chooses the select enterprise menu option or toolbar button. It may also be displayed automatically when the StarOE client application determines that the user is not an external user who, therefore, may have access to multiple enterprises ids. The purpose of the dialog is to allow the administrator to work with a different enterprise, as well as add an enterprise to their enterprise list.

Typically, the dialog is presented with a list of enterprises to which that the user has access as shown at 510. An object constructor takes a user id as an argument and formats and sends a "get user enterprise list" message to the StarOE server 202. The StarOE server 202 returns the list of enterprises for the user to the StarOE client application 204 which then displays the list as shown at 510. The select button allows the administrator to add an enterprise by causing the client application 204 to send an "add user enterprise" message to the StarOE server 202. The search button 514b allows the administrator to search for an enterprise by entering either an enterprise id or part of the enterprise name with wild card characters. A selection of the search button 514b also causes the client application 204 to send a "get enterprise list" to the StarOE server 202. The delete button 514c when pressed, removes the enterprise from the administrator's enterprise list. The cancel button 514d is used to return control to the main window 500.

FIG. 20 illustrates an example of a new/modify users screen 520 used for setting up new users or modifying various options available to the existing users. The screen is typically presented as a modal dialog displayed on top of the main window when a user node 502c is selected and the modify option is chosen from the main window 500. It may also be presented when the new user node 502a and the add new application menu option is chosen. This screen 520 is generally presented by the client application 204 invoking a class object for handling the new/modify user functionality. On construction of this object, an add/modify flag is initialized. If an add flag is set, an empty screen is displayed with an empty user profile in memory and a new password is generated and displayed in the password field as shown at 522. If a modify flag is set, the client application 204 via the object it invoked, formats and sends a "get user info" message to the StarOE server 202. When a response to the message is received, the client application 204 stores user profile received with the response from the StarOE server 202 in memory, and populates the fields on the screen 520 accordingly. The application setup button 524a may be enabled during an add user process for presenting the appropriate application's security setup screen. The cancel button 524c generally prompts the user for confirmation to cancel, and returns control to the main window 500. When a submit button 524b is pressed, the user profile information is sent to the StarOE server 202 using the "set user info" message. This message is always sent during an add process. During a modify process, this message is sent to the StarOE server 202 only if any changes were entered by the user. When the StarOE server 202 receives the message, it returns an acknowledgment message. The client application 204 then returns control to the main window 500.

Figure 21:
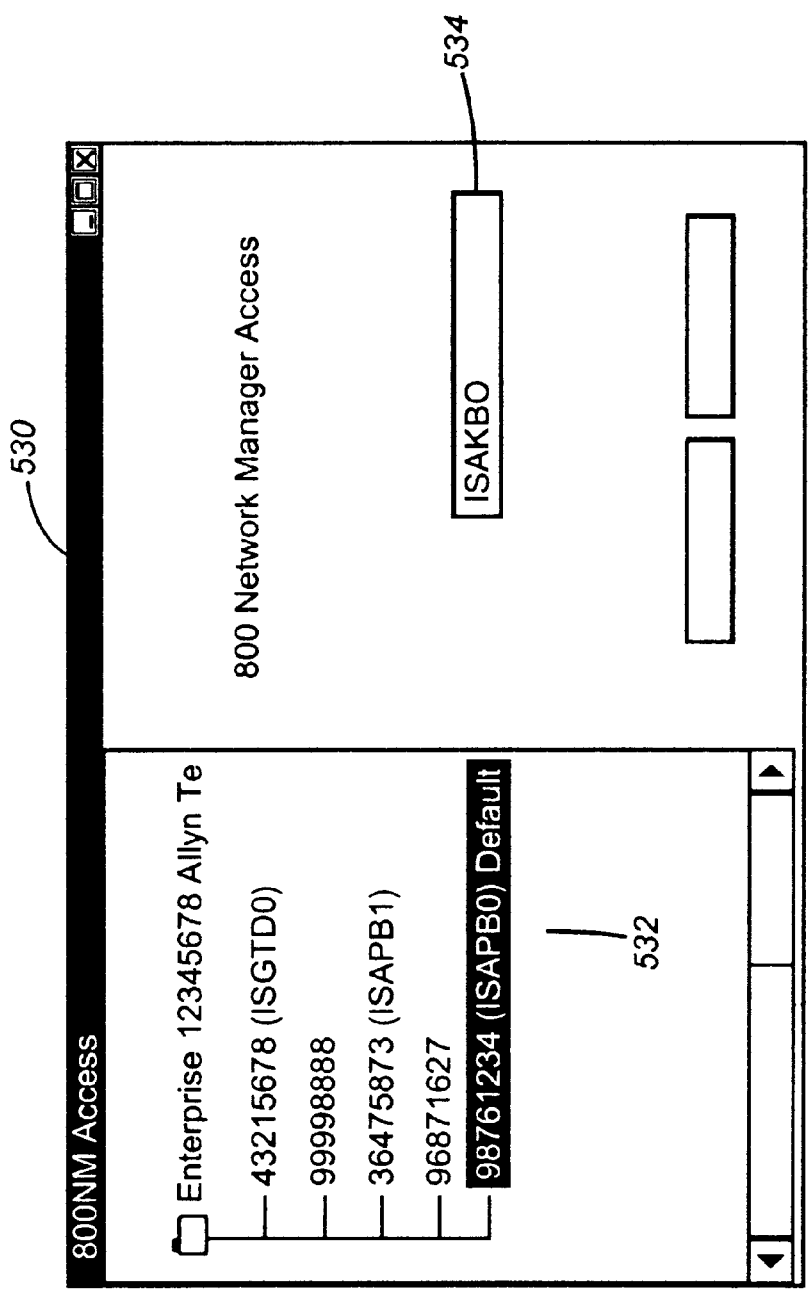
FIG. 21 illustrates a typical screen for setting up Toll Free Network Manager (TFNM) security.

During the StarOE add or modify procedure described above, security information regarding customer entitlements for application services may also be initialized. FIG. 21 illustrates a typical screen for setting up Toll Free Network Manager (TFNM) security information. This screen 530 is typically displayed when TFNM is ordered or modified. The corp ids may be displayed in a tree format as shown at 532. If a corp id is part of the user's profile, a racf id may be displayed with the corp id in the tree. The user id is typically displayed in the title bar. A user's TFNM security profile includes at least one corp id, with each corp id having an associated racf id. The racf ids 534 are manually entered for each corp id. A default corp id is chosen for each user.

A setup security object typically handles the process of setting up security for each application. A constructor for this object initializes the user id and a modify flag as passed in from the StarOE client application 204. The object retrieves the toll free hierarchy from the StarOE server 202 using the "get hierarchy" message. The client application 204 sends the enterprise id, and tollfree flag in the request, and the StarOE server 202 returns the list of tollfree corp ids for the enterprise. If the modify flag is set, a "get security" message is sent to the server 202 to retrieve the user's TFNM security profile. As the tree is loaded with each toll free corp id 532, racf id 534 is entered by a user. When the submit button is pressed, the setup security object calls its send security method which causes the formatting and sending of "setTFNM security" message to the StarOE server 202. When the StarOE server 202 receives the message, it sets the security accordingly for the TFNM application.

Figure 22:
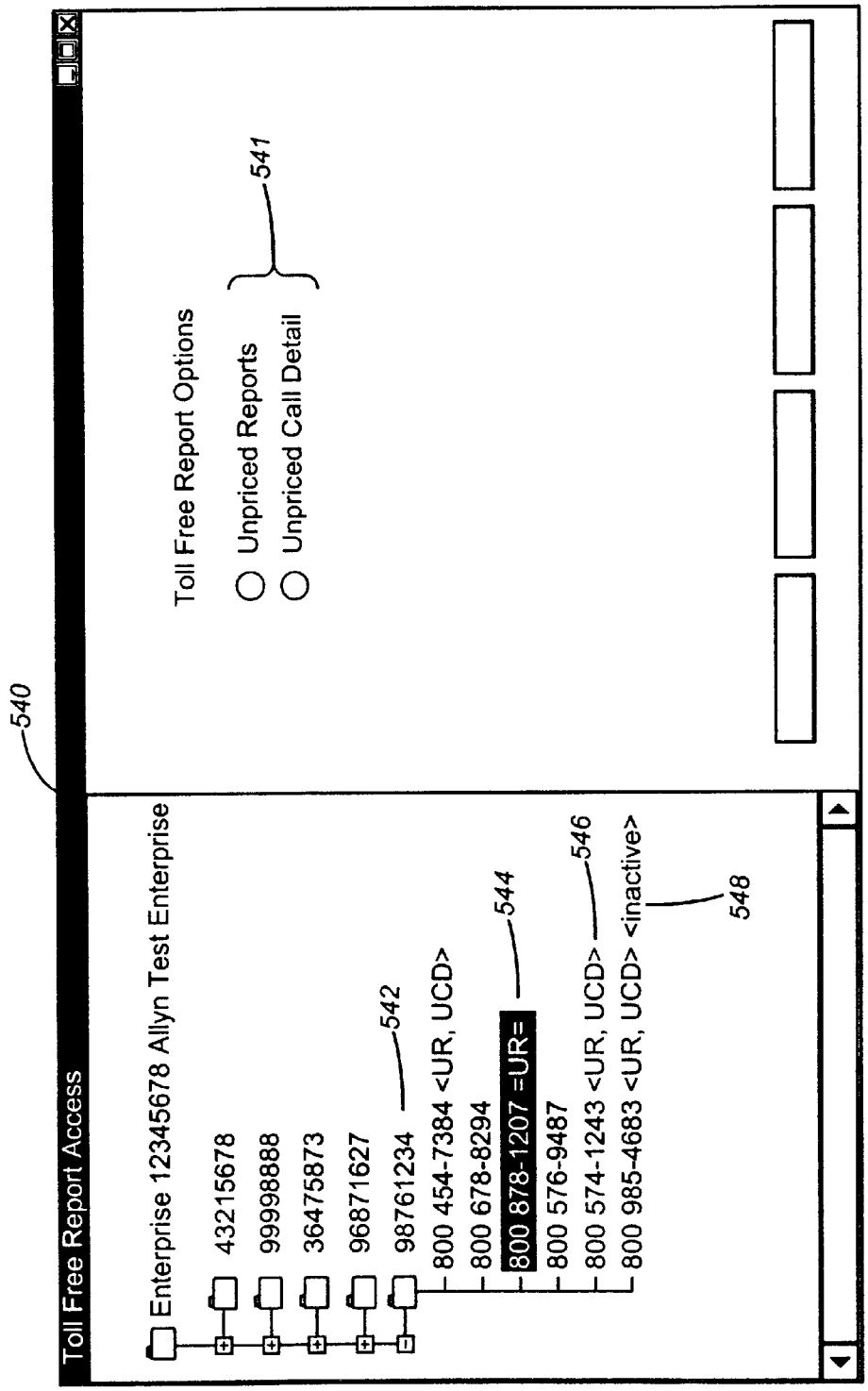
FIG. 22 is a sample StarOE screen for adding and modifying reporting options which are used by the Star-WRS.

The StarOE system is also utilized to order, for example, to add or modify, various reporting options used during report generaton by the StarWRS application is a reporting mechanism for the "networkMCI Internet" and is described in a co-pending U.S. application Ser. No. 09/159,409. FIG. 22 is a sample StarOE screen 540 for adding and modifying reporting options which are used by the StarWRS. The StarOE displays the toll free hierarchy for security setup when toll free reporting is ordered or modified. The hierarchy includes a list of corp ids for a given enterprise, with each corp id 542 having a list of toll free numbers 544 under it. The list may be displayed in a tree format similar to the TFNM security display 530. The reporting options at the toll free number level include unpriced reports, unpriced call detail, and real time monitor reports.

Typically, a user's toll free reporting security profile includes at least one toll free number with at least one reporting option associated. The client application 204 generally invokes an object to handle the reporting option changes and passes in the user id and a modify flag. This object then retrieves the toll free hierarchy from the StarOE server 202 using the "get hierarchy" message. The client application 204 sends the enterprise id, and toll free flag in the request, whereby, the server 202 returns the list of toll free corp ids for the enterprise. If a modify flag is set a "get tollfree security" message is sent to the server to retrieve the user's toll free security profile.

As each corp id is expanded, a "get tollfree numbers" message is sent to the server 202 asking for all the numbers for the corp id selected. As each toll free number is added, a search in the user's profile for that number is conducted. If the number is found, the report options are added next to number text as shown at 546. Furthermore, if the number has been deactivated, a text "<inactive>", for example, is added to the display as shown at 548. The inactive numbers are not modifiable. When the unpriced reports or unpriced call detail check boxes are changed, the text next to the toll free numbers selected reflects the state of the check box. The check boxes depict report options to which a user has access for toll free numbers. When more than one toll free number is selected, the check boxes are marked unchecked. When a submit button is pressed, the object calls its send security class method which causes the formatting and sending of a "set user tollfree security" message to the StarOE server 202.

Figure 23:
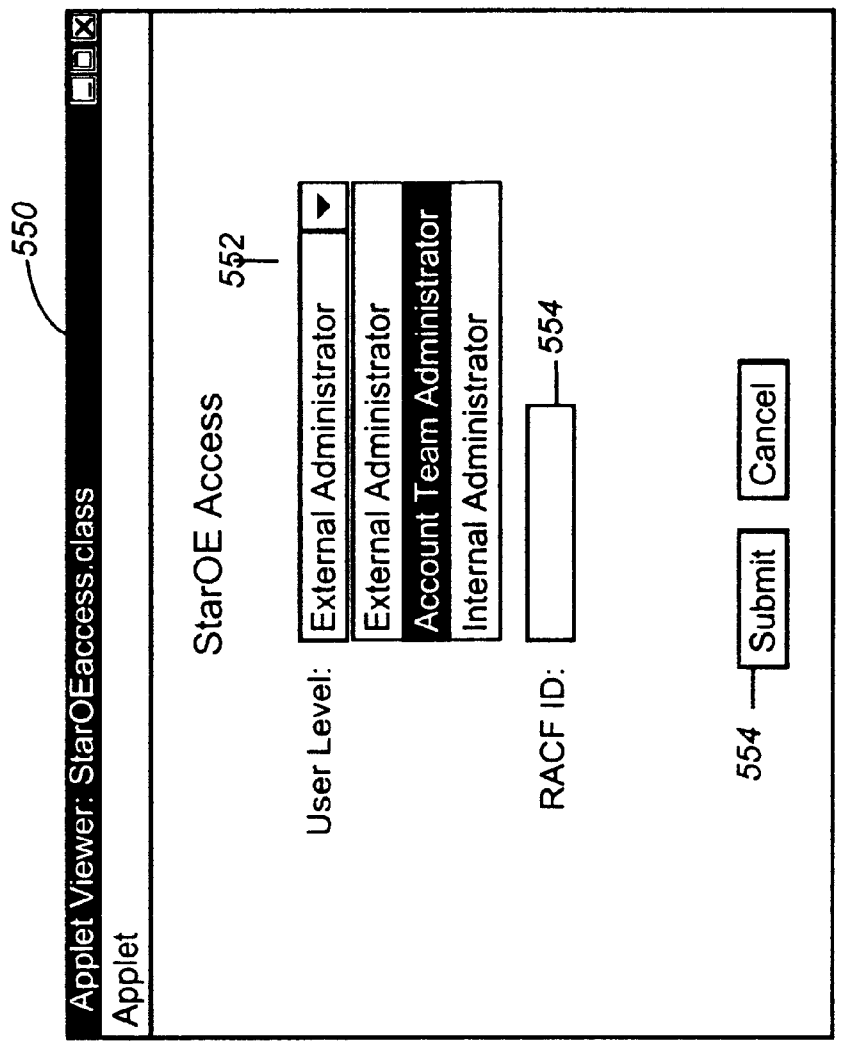
FIG. 23 is a sample of the StarOE access setup screen.

In addition to handling the orders for the suite of applications in the "networkMCI Interact", the order entry application, StarOE, may also be modified via the StarOE. FIG. 23 is a sample of the StarOE access setup screen 550. The StarOE order object is created any time the StarOE node for an existing user is selected and the edit/modify menu option is selected from the main window 500. It may also be presented when the Application Setup button 524a is pressed on the new user screen 520.

Typically, the StarOE client application 204 invokes a class object for handling the StarOE order functionality. The object's constructor initializes the user id of the user being configured, a modify flag, and the StarOE level of the logged in administrator as passed in from the client application 204. User level options 552 may be set according to the administrator's StarOE access level. The administrator may not select an access level that is higher than the present level. For example, an account team may not change a user's access to an internal level. When a submit button 554 is pressed, the racf id is checked for a valid value, then the object calls the iSendSecurity( ) method which formats and sends a "set StarOE Security" message to the StarOE server 202.

The Racf id represents the user's mainframe id. The user level is used to determine the level of access the user has within StarOE. An administrator may have one of the following access levels: external, account, and internal. External administrators have access to view and update all users under their enterprise. They may be able to modify a user's security for the applications that they have permission for administration. These users may not be allowed to order applications, but may need to request their orders through their account team representative. An account administrator is used for account team members. This level of user may have the ability to view user lists for multiple enterprises, and configure a user's application access information. Internal users have the same privileges as account administrators, as well as the ability to order new applications for new and existing users. Internal administrators also have the ability to setup global security information for each application. The internal administrators have access to multiple enterprise ids.

Figure 24:
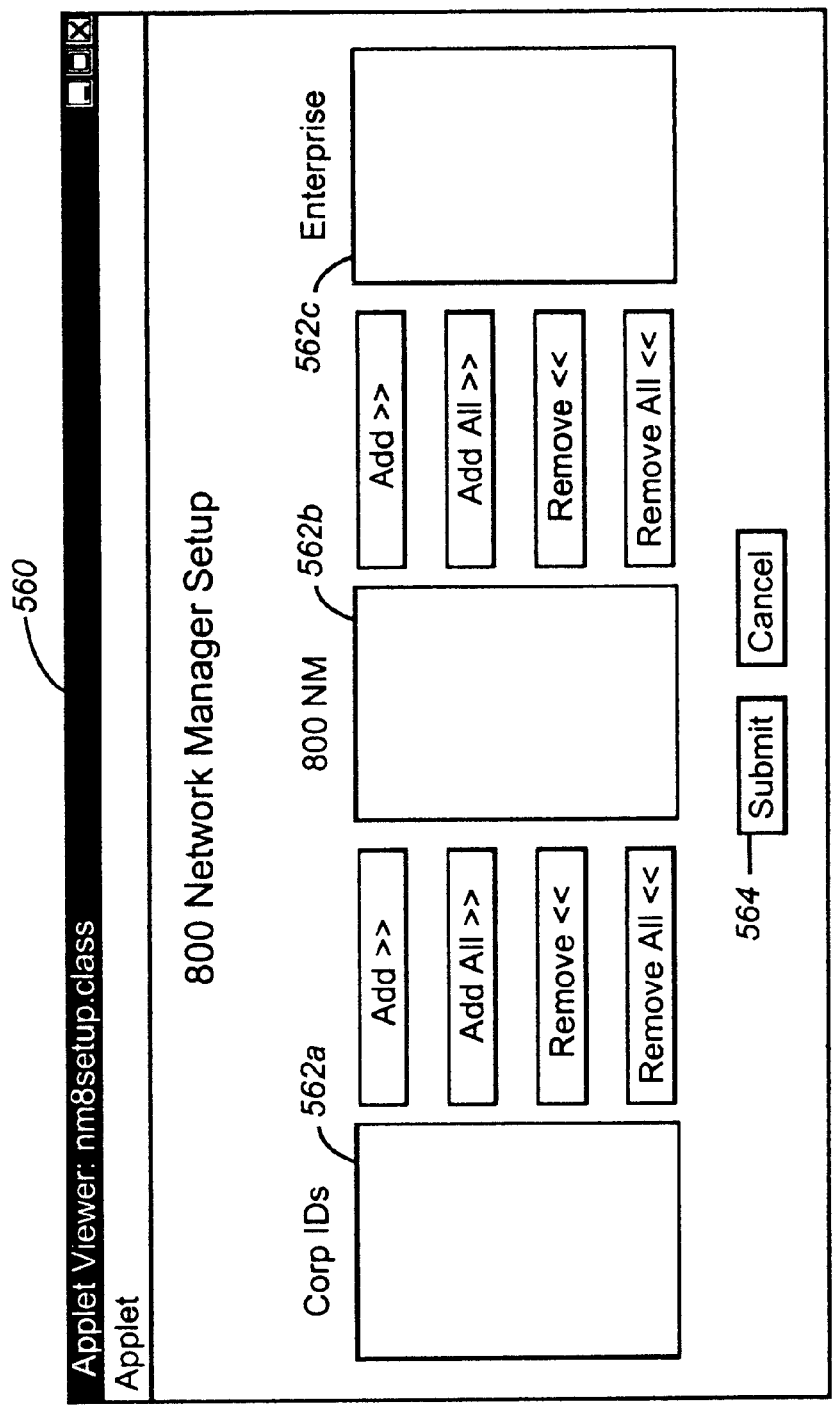
FIG. 24 illustrates a toll free network manager setup dialogue selected from the main window.

The StarOE is also utilized to setup global security for corp ids. The purpose for setting up global security is to allow the administrator to make corp ids available for inclusion in users' profiles. FIG. 24 illustrates a toll free network manager setup dialogue selected from the main window 500. Initially, the toll free corp id list is retrieved from the server 202 via a "get hierarchy list" message. The toll free numbers are placed in appropriate boxes 562a,b,c, based on the flag returned with the hierarchy list, i.e., ' ' for corp ids, '8' for TFNM, and 'E' for enterprise. Corp ids in the corp id box 562a are those toll free corp ids for a given enterprise which have not been made TFNM participants and TFNM enterprise participants. The TFNM list 562b includes all toll free corp ids for a given enterprise that have been made TFNM participants. The enterprise list 562c includes all toll free corp ids for a given enterprise that have been made an enterprise level TFNM participant. Once the corp ids in the list are placed in the appropriate boxes, a user may then move the corp ids among the list boxes. For example, if a corp id is in the "corp id" list 562a, it may be moved to the "TFNM" list box 562b. Corp ids in the "TFNM" list box 562b may be moved to the "enterprise" list box 562c. Pressing the submit button 564 causes a "set TFNM corpid" message to be sent to the StarOE server 202. The server 202 then notifies and sends any corp ids moved among the list boxes to the mainframe registry. The corp ids are then added to the user's profile. FIGS. 21, 22, and 24 illustrated screen displays for performing various order entry and administrative functions for the TFNM. Other application services, including reporting for VNET, Vision, Broadband, Call Manager, and invoice reporting may be ordered and the security information pertaining to each application may be modified in a similar manner.

The screens illustrated in FIGS. 18–24 and associated class objects are invoked from the StarOE client application 204, which is launched by the backplane unit as described above. The StarOE client application 204 employs a Java application program and is implemented by extending the COApp class, one of common objects provided and utilized in the present invention. Because the client program 204 is not implemented as an applet, and also because the client program 204 employs the container Frame for customer display windowing purposes, the client program 204 runs, to a degree, independent of the browser within which the backplane is deployed.

The StarOE client application interacts with the StarOE server in providing various order entry functions for all applications as described above and will be described below in reference to the back-end functionality of the StarOE. Communications between the StarOE client 204 and the server 202 typically use TCP/IP, running a UNIX process listening in on a known TCP port.

The StarOE Server

The StarOE server 202 includes a number of processes for performing a number of specific functions. For example, a fulfillment process monitors new customers being added to the system and notifies a fulfillment house accordingly. The fulfillment house then may send appropriate subscription packages according to the information received from the fulfillment process to the new customer. Another process, a reconciliation process, may handle synchronization of data with a mainframe system database and also with databases associated with the individual fulfilling systems. Yet another process, a billing process, may handle directing billing information to different billing streams.

The OE server 202 stores all the "networkMCI Interact" users and their security information such as passwords, application entitlements and hierarchies which may be requested by other application servers and clients in the network. Each user or customer is given a username and a password for accessing the "networkMCI Interact". In addition, during the order entry process, each user in the "networkMCI Interact" is provided with entitlement and hierarchies describing the user's access privileges to specific application services and also to various sub-services available within the applications.

Generally, the hierarchies are customer-defined during the order entry process, and describe the subdivision of calls into nodes arranged in a n-way tree. The "networkMCI Interact" back-end servers apply the hierarchy definitions to their data at report time when generating reports, typically as queries on a node-by-node basis to the result data set which was extracted using any other criteria supplied. The trees of the hierarchies have essentially arbitrary complexity, i.e., the number of nodes is unlimited. Each node is assigned calls according to a template of conditions. Conditions may be defined as a combination of one or more ANIs, corp IDs, ID codes, Card numbers, account codes, location/node ids, etc. These filters may be applied at any node in the tree. The hierarchies may be applied as both selection criteria (e.g., "report on all calls at these nodes or their descendants", in combination with other criteria) and roll-up targets (e.g., group the results in this report at this level in the tree). These entitlement and hierarchies may be modified via the StarOE client application executed in the customer workstation 204.

An example of a service provided by the StarOE is an authentication process during a "networkMCI Interact" customer login procedure. As described above with reference to the StarOE client application, an initial access to the suite of network applications ("networkMCI Interact") is obtained through the Web pages invoking a login process and a backplane logic. A more detailed description of the login process and the backplane can be found in the co-pending U.S. patent application Ser. No. 09/159,515. The login process typically begins with a customer entering a username and password pair on an initial Web page retrieved from the Web site providing the suite of network applications. Referring to FIGS. 6 and 7, a process running in a client platform sends transaction request messages via the Dispatcher 206 to the OE server 202. The StarOE server 202 generally responds to requests by searching the security profile for the information requested, formulating appropriate transaction response messages and transmitting them back to the requesting process. More particularly, during the login procedure, the client login process formulates a transaction message including a user name/password and a validation request for a given customer. The StarOE server 202 looks for the matching name/password pair in the security profile for the customer, and if the name/password pair is found, the server 202 formulates a valid user message response for the login process running in the client platform, including in the message the enterprise id, time zone, and user id information, and transmits the response via TCP/IP back to the login process. In addition, each user password maintained in StarOE is set to expire at a predefined interval, e.g., every 90 days. Accordingly, when the StarOE server 202 detects that the password has expired, the server 202 notifies the customer, via the client application 204 to change the password. The changed password is sent to the StarOE server 202 formatted in a message interface, "change password request;" for example. The server 202 upon receiving the message updates the password for. the given user in its user profile typically stored in the database 314, and responds with appropriate return codes to the StarOE client 204. The login process, upon receiving the response may then continue with its normal course of processing.

Another example of a service provided by the StarOE is retrieving an application entitlement list for a given customer. As described briefly above, an entitlement describes a privilege or authorization that a customer has. It is akin to the access levels in UNIX which are granted when a customer belongs to certain user groups. It describes what applications a customer may access. It also describes what the customer may be allowed to do within that application. In addition, it describes what back-end services that application and customer combination may access. For example, a customer may be entitled to use or access many applications and for each application, the customer may have a different set of entitlements. These entitlements may come in two different sets. The first specifies what the customer may do with this application. For example, it may allow the customer to have update access to a particular view and only read-only access in a different view. The second set of entitlements specify what back-end services this particular application and customer may access.

As described previously, all the information relating to entitlements for a given customer is stored in customer profile database 314 located with the StarOE server. When the backplane requests via TCP/IP the entitlement transaction, for example, in a get application list request message, the security module retrieves and transmits back via TCP/IP to the backplane the list of authorized applications accessible by a given customer in a transaction response. The backplane uses the list to determine which buttons on the "networkMCI Interact" home page should be activated, thus controlling access to products. Similarly, individual back-end application servers 208 may make a request for entitlements within that application for a given customer. For example, the StarWRS, a "networkMCI Interact" reporting system, generates a request for hierarchy data for VNET, VISION, and Toll-free customers whenever reports need be generated. In response, the StarOE retrieves the corresponding hierarchy data and transmits them in real time to StarWRS.

The Outbound Network Manager (ONM), for managing the customer's private networks such as VNET and Vision networks, is another example of an application service having application specific customer entitlements defined and maintained in the StarOE database 314. For instance, the customers ordering ONM sign up at the corp id level. Each user may be associated with multiple corp ids. In addition, each user may have one or more of the entitlement features within ONM, including: CPN Order, Calling Card Order, Dialing Plan Order, ID Code Set Order to which orders a user's access may be permitted or restricted; Approve Order signifying approval authority in creating orders; Modify Order for defining user's authority to modify/delete orders.

In providing the authentication, entitlement, and hierarchy information, including those described above, the StarOE server 202 includes the StarOE database 314 for storing user profiles locally. Additional data needed are typically accessed from the enterprise host systems 320. The StarOE server 202 may be implemented as a concurrent server allowing simultaneous multiple client connections. The server 202 listens on a known port, and when a client connects, the server 202 forks a new process to handle the client connection. The server 202 may also implement a thread to handle each client connection.

The StarOE server 202 may be implemented utilizing the object oriented programming (OOP). At startup the oe_serv process instantiates an OEServ object, an OEConfig object, and a Logger object. The OEserv object is an instance of a main server class for starting the server processing including reading in the configuration and setting up the listening sockets. The OEConfig object is used to read specific StarOE configuration values, and the Logger object logs informational, warning, and/or error messages to a file. The OEConfig and Logger objects are typically set to Global so that all classes may access configuration value and log messages. The OEServ object then creates a Rogue Wave RWServerSocket object which creates a server socket connection and begins listening for client connections. The Rogue Wave Net++library is typically used for socket communications.

The OEServ object includes a RWServerSocket object which waits to accept a connection from a client. When a client connects, a ClientHdlr object may be instantiated to handle the client connection. The ClientHdlr inherits from the Child class which when constructed, forks a new process for handling the client connection.

The ClientHdlr object reads the message header and determines how much to read for the following message request which includes message request header and body. The message request is read and the message id is interrogated. A switch statement on the message id determines how the message may be processed. The proper classes may then be instantiated to handle the request and determine the response. When the response is determined by the proper class, the ClientHdlr then may create a message header and response header including a return code and/or an error code. The ClientHdlr then sends the message back to the client with the response. The ClientHdlr typically need not know the contents of the request or the response message, instead, the ClientHdlr may act as a conduit for passing messages from the client to a proper class to handle the request, and relay the response from the proper class back to the client.

Some examples of the proper classes include the TollfreeSecurity class, the Application class, and the Hierarchy class. In addition, the server includes many other classes for processing specific functions. The TollfreeSecurity class encapsulates Tollfree security and access into the database tables having tollfree security detail information. When the ClientHdlr receives a Get User Tollfree Security request from the client, the TollfreeSecurity class is instantiated. The Get( ) method in this class access the database tables and returns the list of corp ids and tollfree numbers for this user. The ClientHdlr formats the data into a reponse message and returns the message back to the client.

The Application class encapsulates the interface into the database table having applications information. Any reading or writing to this table may be handled by the methods within this class. When the ClientHdlr receives a Get Application Request, the Application class is typically instantiated. The Get( ) method in this class accesses the Applications table in the database and return the list of application codes and their descriptions. The ClientHdlr then formats the data into a reponse message and returns the message back to the client.

The Hierarchy class encapsulates all hierarchy information and the methods to access this data in the database. When the ClientHdlr receives a Get Hierarchy List request, the Hierarchy class is instantiated. The Get( ) method in this class determines which Hierarchy product is to be retrieved (e.g., Tollfree, Vnet/CVNS, or Vision) and returns the appropriate information. The ClientHdlr then formats the data into a response message and returns the message back to the client. The details of the message format, including request and response messages, are described with reference to FIG. 13.

Order Entry Process Via StarOE

Figure 10:
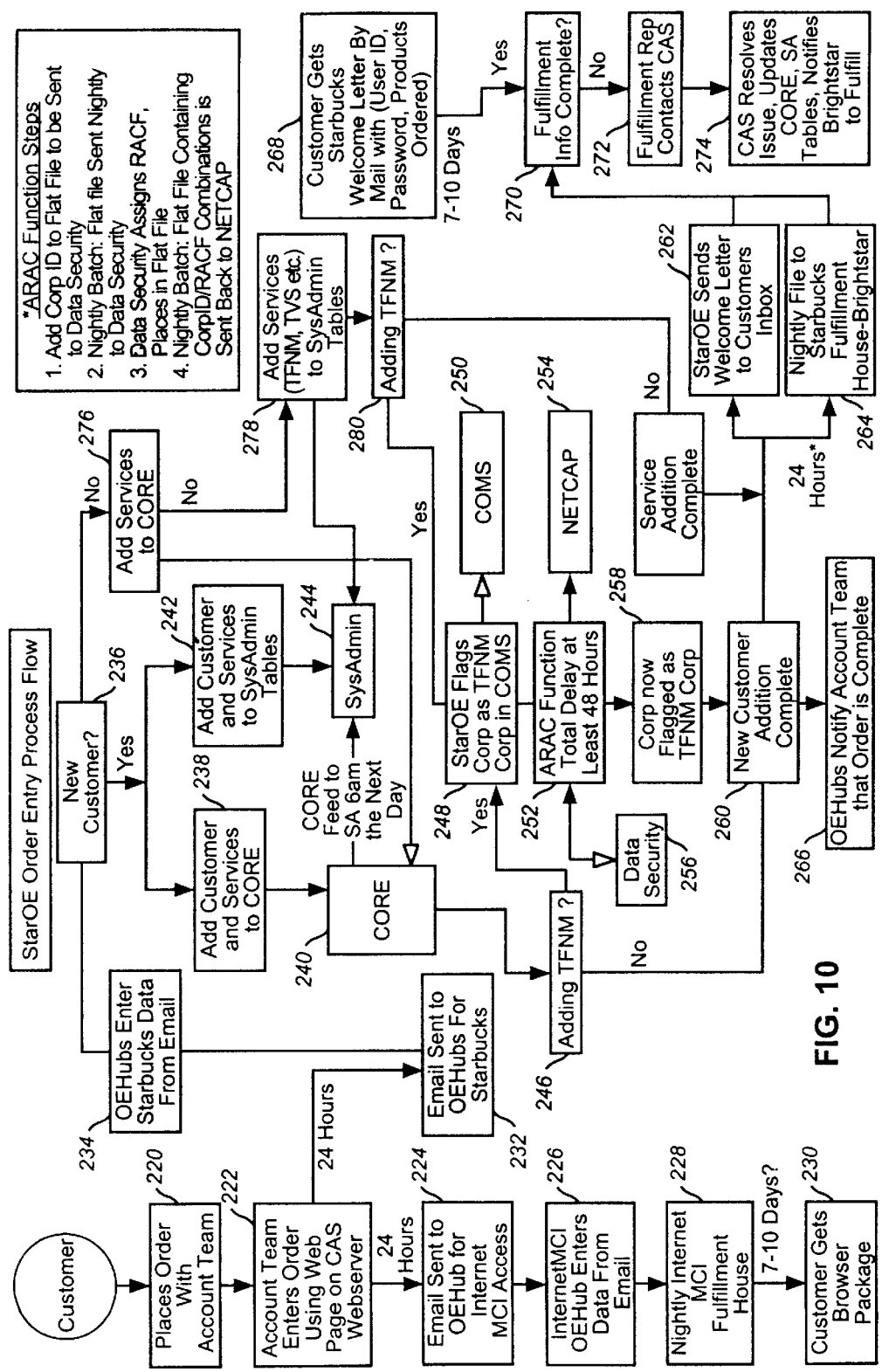
FIG. 10 is an illustrative example of an order entry process flow in the system of the present invention.

FIG. 10 is an illustrative example of an order entry process flow in the system of the present invention involving the functionalities described above. This process flow is used whenever a customer needs to interact with the StarOE system, whether it be as a new customer, or existing customer adding application services, or an existing customer changing individual passwords or work assignments for a specific application. The order entry process begins when a customer places an order for addition, modification or deletion of services, as shown in step 220. In step 222, an accounting team uses a new Web-based interface to enter the customer information. Typically, on a nightly basis, one or more e-mails may be generated to OEHub for Internet-MCI access as shown in step 224, and to networkMCI Interact OEHubs as shown in step 232. At step 226, if the order is for a new customer, or if the existing customer needs a new browser package, then the OEHub handling Internet MCI service enters information from the e-mail to add or delete the customer. StarOE server then passes on mailing information to the fulfillment house, as indicated at step 228, which mails a package including the browser to the new customer to complete the process. The customer typically receives the browser package in 7–10 days. The fulfillment processing will be described in more detail with reference to FIG. 14.

In step 234, the OEHubs enter data received from the e-mail. In step 236, if a new customer was added, the OEHubs add the customer information into the mainframe system via a direct interface as shown in steps 238 and 240. In steps 242 and 244, the new customer and service application information is added into the StarOE server database.

In step 246, additional steps are performed by StarOE if necessary for each application. For example, if an added service is a Toll Free Network Manager (TFNM), additional flags are tagged and stored in the application's server as shown in steps 248 to 258. In step 260, when the process of adding a new customer is complete, a fulfillment process, another component of the StarOE sends a welcome letter to the customer's inbox created as part of the addition process and transmits the new customer information to a fulfillment house as shown in steps 262 and 264. In step 266, the OEHub notifies account team that the order is complete.

In response to the transmission from the fulfillment process, the fulfillment house, in step 268, produces and mails a welcome letter that includes the user ID, a password to be used for the first logon and a list of applications the customer ordered. In step 270, if for any reason, the fulfillment process did not complete, a fulfillment representative contacts customer services, in step 272. In step 274, the customer services resolves issues by manually performing the fulfillment functions.

In step 276, if new services were added by an existing customer, the services added are updated to the mainframe system. In step 278, the StarOE database is also updated with the additional services. In step 280, if a service application requires specific added processing, for example, the TFNM, the additional processing are performed in step 248 through 266, as described previously.

Figure 11:
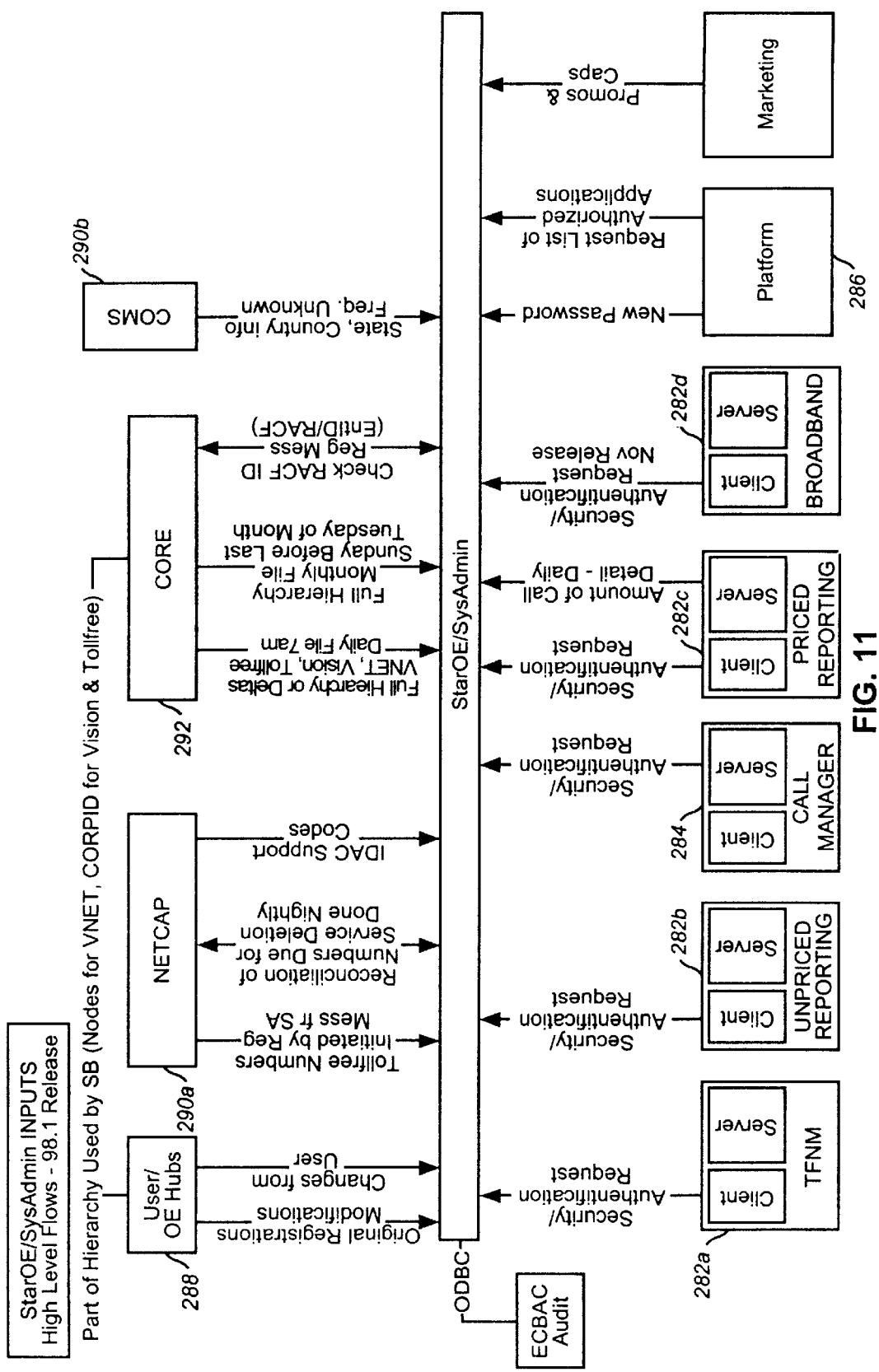
FIG. 11 is an input process flow diagram, illustrating inputs to the system of the present invention.

FIG. 11 is a high level input process flow diagram, illustrating inputs to the system of the present invention. The present invention handles a wide variety of key function for the suite of network applications. Each application will, herein forth, be also referred to as a fulfilling system, having a fulfilling client and a fulfilling server. The system of the present invention handles security and authentication requests from both the client and server sides of each fulfilling system as shown in 282a–d and 284. These requests are automatically generated whenever the customer makes a request of the server. For example, they are generated when a customer clicks on the icon for a service such as TFNM.

In addition, when a customer first logs on, the customer is presented with a dialog box prompting for user ID and password. When the customer clicks a submit button, for example, the backplane (or platform) verifies the customer is valid by inquiring with the StarOE system as shown in 286. The return response is either "invalid user/password" or "valid user". When the customer has been authenticated, the customer is then presented with a list of authorized applications. This list determines which buttons, for example, representing each application are active, thus controlling customer access to products and services.

In addition, also shown in 286, the customer is issued a temporary password with the customer's fulfillment package. This temporary password is used to log into the system the first time. During the initial logon process, the customer is prompted to create a new password, which replaces the temporary password in the database. Moreover, the customer may be required to change the password every 30 days, for example, for security reasons.

Information may also be entered and requested by a number of sites other than a user platform. For example, OE Hubs 288 may enter information directly into the StarOE database to register new customers to the integrated suite of network applications. They may also access the data in StarOE directly to modify customer information, and to add or remove subscribed services.

Other inputs to the StarOE server may include entitlement data from the individual fulfilling systems 290a, 290b. For example, the mainframe 290a may send the appropriate hierarchy of tollfree numbers for a specific customer in response to registry message registering the new customer to the mainframe 290a. The hierarchy of tollfree numbers describes the new customer's entitlements to the TFNM services. This hierarchy may be used by other services in the integrated suite of network applications, for example, a Reporting application.

As described above, the StarOE is a repository for customer authentication and entitlement information. These authentication and entitlement data are usually transmitted from mainframe systems 292, 292a, 292b. For example, the mainframe system 292 generates two sets of hierarchy files on a daily basis. One set comprises deltas only, the other comprises a full hierarchy. Notification is made to the StarOE when these are available. At a set time each day, for example, 6:00 A.M., the StarOE, the reconciliation process more specifically, picks up the files via FTP and either replaces the previous day's hierarchy file with the new information (full file) or updates the previous day's file using the files having the updated data only. During this process, the reconciliation process first locks the database so that no other requests for data services may be made.

Figure 12:
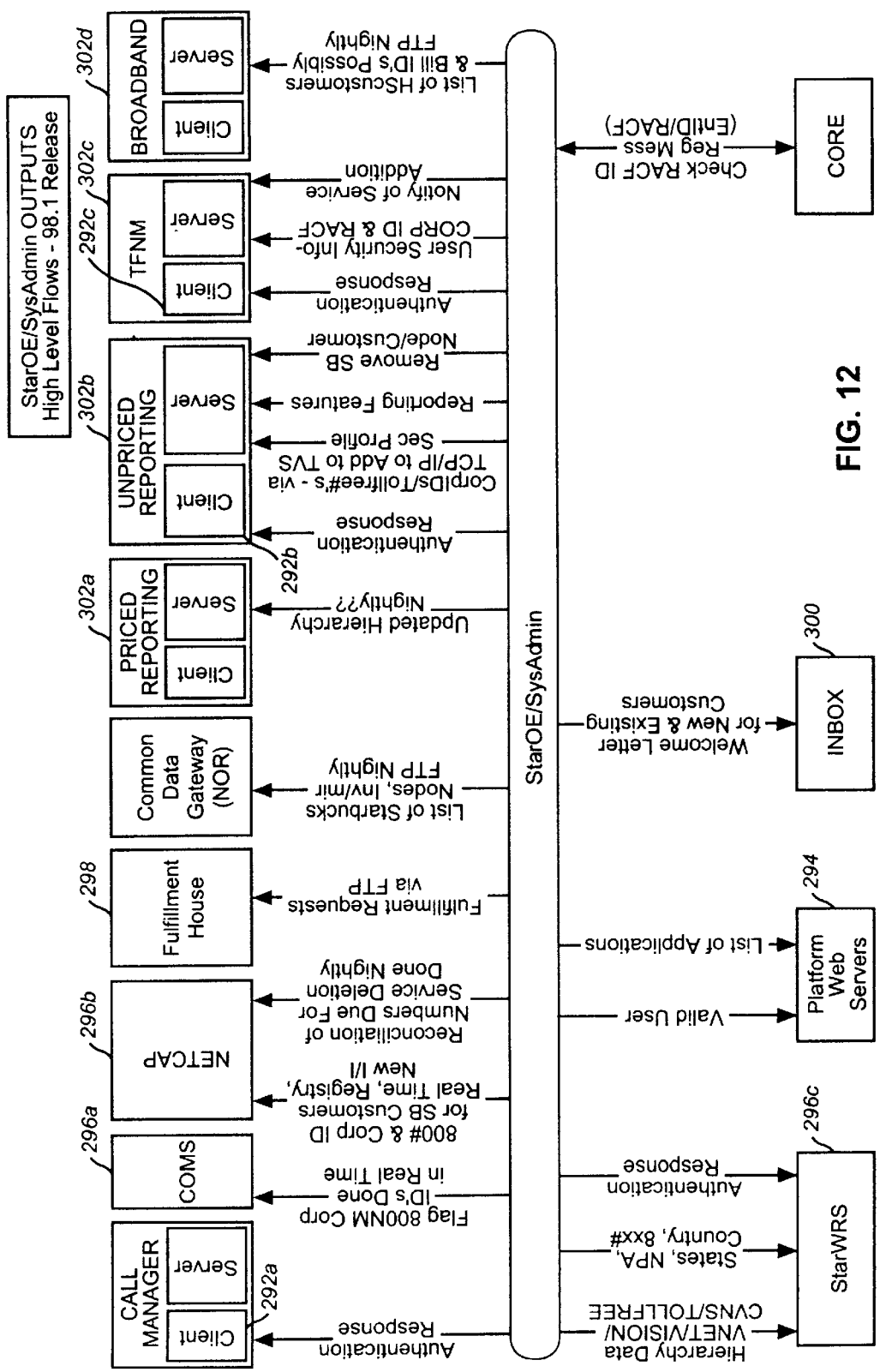
FIG. 12 is an output process flow diagram, illustrating outputs from the system of the present invention.

FIG. 12 is an output process flow diagram, illustrating outputs from the system of the present invention. The StarOE outputs various responses to the requesting systems and processes. An example of an output is an authentication response to the client side of the individual applications 292a–c as well as the backplane platform 294. In addition, a list of accessible applications for a given customer, is output to the backplane platform 294. The StarOE also outputs various updated data to database systems associated with specific individual applications 296a–c in the suite of network applications. In addition, the individual fulfilling systems 302a–d receive messages from the StarOE regarding modifications effected by a customer interaction. For example, as part of the reconciliation process, the StarOE may pass a list of toll free numbers to be deleted from Traffic View. These numbers represent the services which are discontinued. Upon receipt of this information, the Traffic View server sends another message to a system responsible for collecting call detail information which system then discontinues collection of call data for the numbers deleted. Another example output to individual fulfilling system is hierarchy data to Reporting fulfilling system 203c when a customer requests reports. The customer hierarchy data is sent in real time by the StarOE for up-to-date report information.

Additionally, the fulfillment house receives transactions from the StarOE. The StarOE, for example, by a fulfillment process, pushes a file including new customers to the fulfillment house 298, for instance, via FTP. This file includes customer mailing information, user name and password. The fulfillment house 298 creates a welcome package including the customer's user name and temporary password, and sends the package. The customer receives this package and uses the temporary password to logon to the system of integrated suite of network applications the first time. During the initial logon process, the user may be prompted to create a new password, which replaces the temporary password in the StarOE database. Upon logon, the user may find another welcome letter which lists the subscribed applications. This welcome letter was generated by StarOE server via e-mail when the order entry process was completed, and went to the Inbox 300 at that time.

StarOE Transaction Messages

Figure 13:
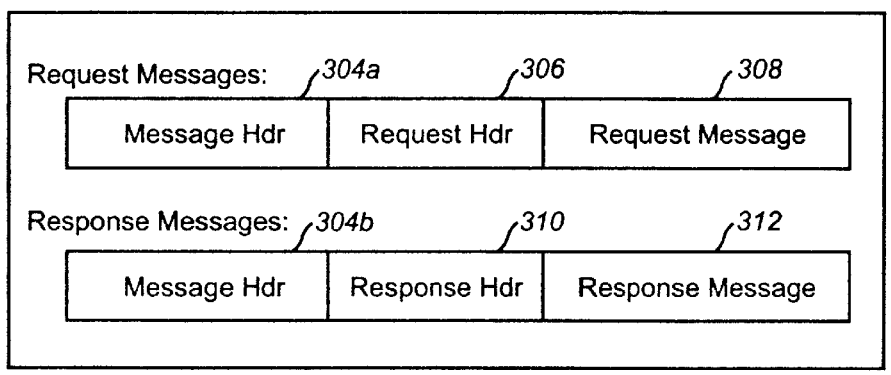
FIG. 13 illustrates message formats used in transaction requests and responses communicated to and from the client and server applications in the system of the present invention.

FIG. 13 illustrates message formats used in transaction requests and responses communicated to and from the client and server applications in the system of the present invention. As described with reference to FIG. 6, the client applications typically send messages to the StarOE via the dispatcher 206 FIG. 6. The messages are generally a stream of bytes including characters and each message typically has an order and format. The messages may also include fields of primitive types such as int or short.

The client applications, typically implemented in languages such as Java, encapsulate the message structures into class object. The application server programs including the StarOE, typically implemented using low level compiler languages such as C or C++, receives the message objects from the client applications as a stream of bytes and map the message objects into appropriate C structures. Typically, all the structures are aligned on byte boundary, byte aligned and in network byte order, so that Java objects may be mapped correctly into the C structures on the StarOE.

The StarOE messages have fixed formats. For example, for a request transaction, the request message 308 is preceded by a message header 304a and a request header 306. A response message 312 is preceded by a message header 304b and a response header 310.

The message header 304a, 304b is sent as the first part of all messages sent to or from the StarOE so that the receiver may know the size of the message being sent. This mechanism allows the server or client to read the proper number of bytes. When the OE server receives a message, a communications layer of the StarOE strips off the message header structure and adds it to all responses associated with this message.

The request header 306 follows the message header 304a on all messages sent to the StarOE. The StarOE examines the request header 306 for determining the type and version of message. It allows the StarOE to map the message to the correct C structure for subsequent processing. Similarly, response header 310 follows the message header 304b on all messages sent from the StarOE. The response header 310 precedes all response messages.

Figure 9:
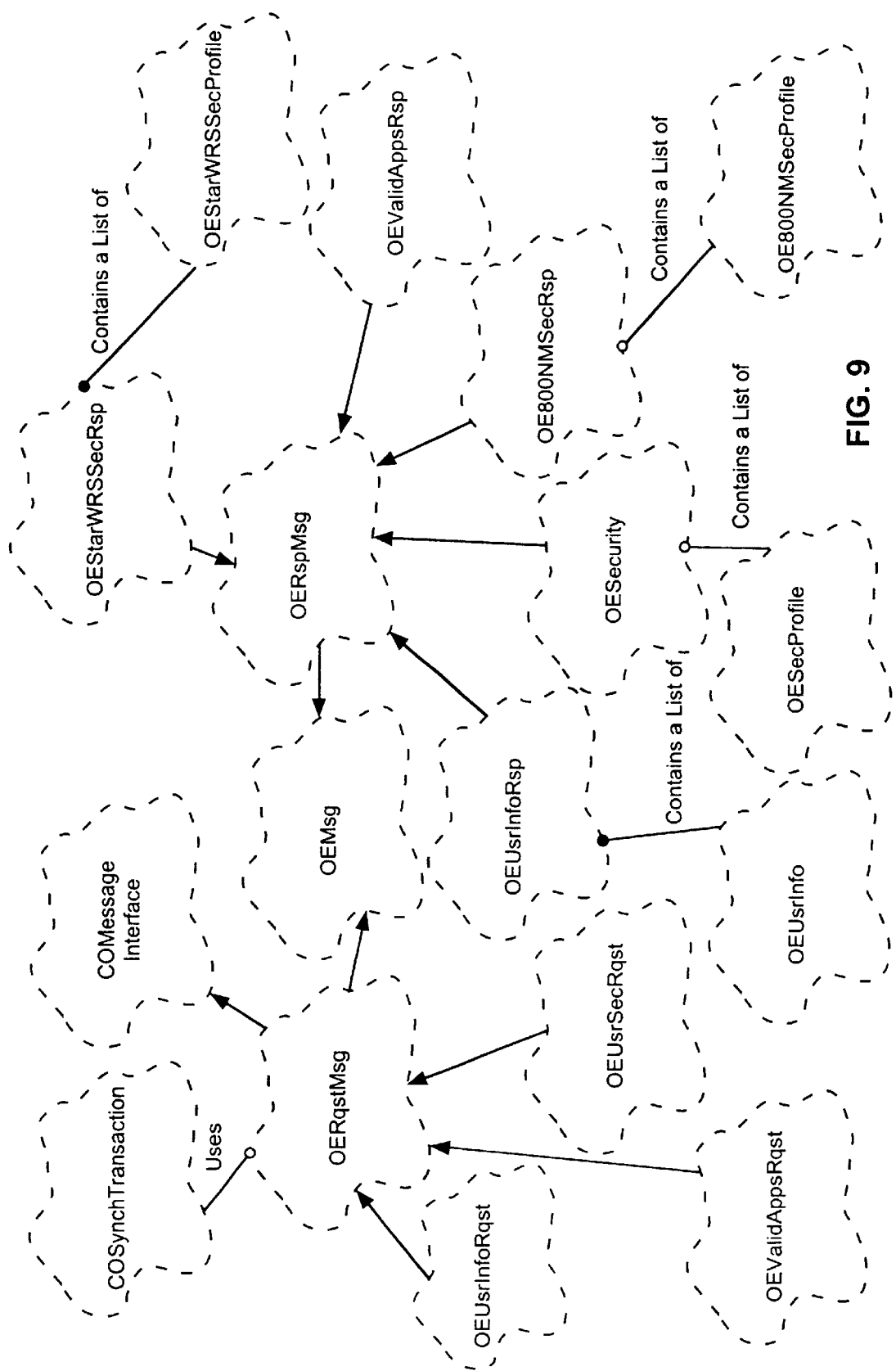
FIG. 9 illustrates message class diagram showing relationship among the classes utilized in the present invention.

The StarOE client program typically implements message transactions using class objects. FIG. 9 illustrates messages class diagram utilized in the present invention. The messaging classes 570 hide the complexities involved in issuing a transaction to the StarOE. Common functions are implemented in the base message classes encapsulating much of the effort required to build message classes. Message classes are created generally for requests and responses distinctly.

The request and response classes derive from the common base class OEMsg 572. The class OEMsg 572 encapsulates the common message header required by the StarOE. The classes OERqstMsg 574 and OERspMsg 576 serve as common base classes for the request and response messages respectively. All request messages also implement the COMessage interface. COMessage functions provide the necessary hooks to send and receive messages from the client platform to the back-end application servers. All StarOE messages use the synchronous transaction mechanism, wherein the transactions block until a response is received.

The following codes illustrates retrieval of user information using the order entry message classes.

OEUsrInfoRqst usrInfo=new OEUsrInfoRqst("abecar", session);
if (usrInfo.doIt( )==true) { OEUsrInfoRsp uinfo= (OEUsrInfoRsp)usrInfo. getResponseobj( );
  OEUsrInfo info=uinfo.getUsrInfoobj( );
  System.out.println("First name:"+info.firstName);
}
else
System.out.println("Failed to retrieve user information");

Once a request object is built, the method doIt( ) on the OERqstMsg 574 class must be invoked to initiate the transaction. The method doIt( ) may block until a response is received. A boolean return code is returned by doIt( ). To obtain the response data or detailed error code information the method getResponseObj( ) must be invoked to return the built response object.

Specific transaction messages communicated in the system of the present invention include "validate user message" for authenticating the customer's username/password pair, "get user application list message" for retrieving a list of applications to which the customer is entitled, and "update password message" for changing the customer's password. These transaction messages are typically communicated between the StarOE and the backplane unit. These messages may also be used by other application services to verify entitlements in the event an extra level of security is desired.

Examples of transaction messages communicated between the StarOE server and the StarOE client include "get user info" for retrieving customer's information such as name, address, timezone for the location of the customer. Another example of a transaction message communicated to the StarOE system by all the application clients and servers may be a "get user security message" for retrieving customer's security information including the userid, usertype which describes whether the customer is a regular user or an administrator, and access id for describing the customer's access level. The system of the present invention includes a number of such transaction messages described above for specific type of requests and responses communicated to and from the OE system and, moreover, additional message specific transactions may be added as necessary.

StarOE Interface to Fulfillment House

Figure 14:
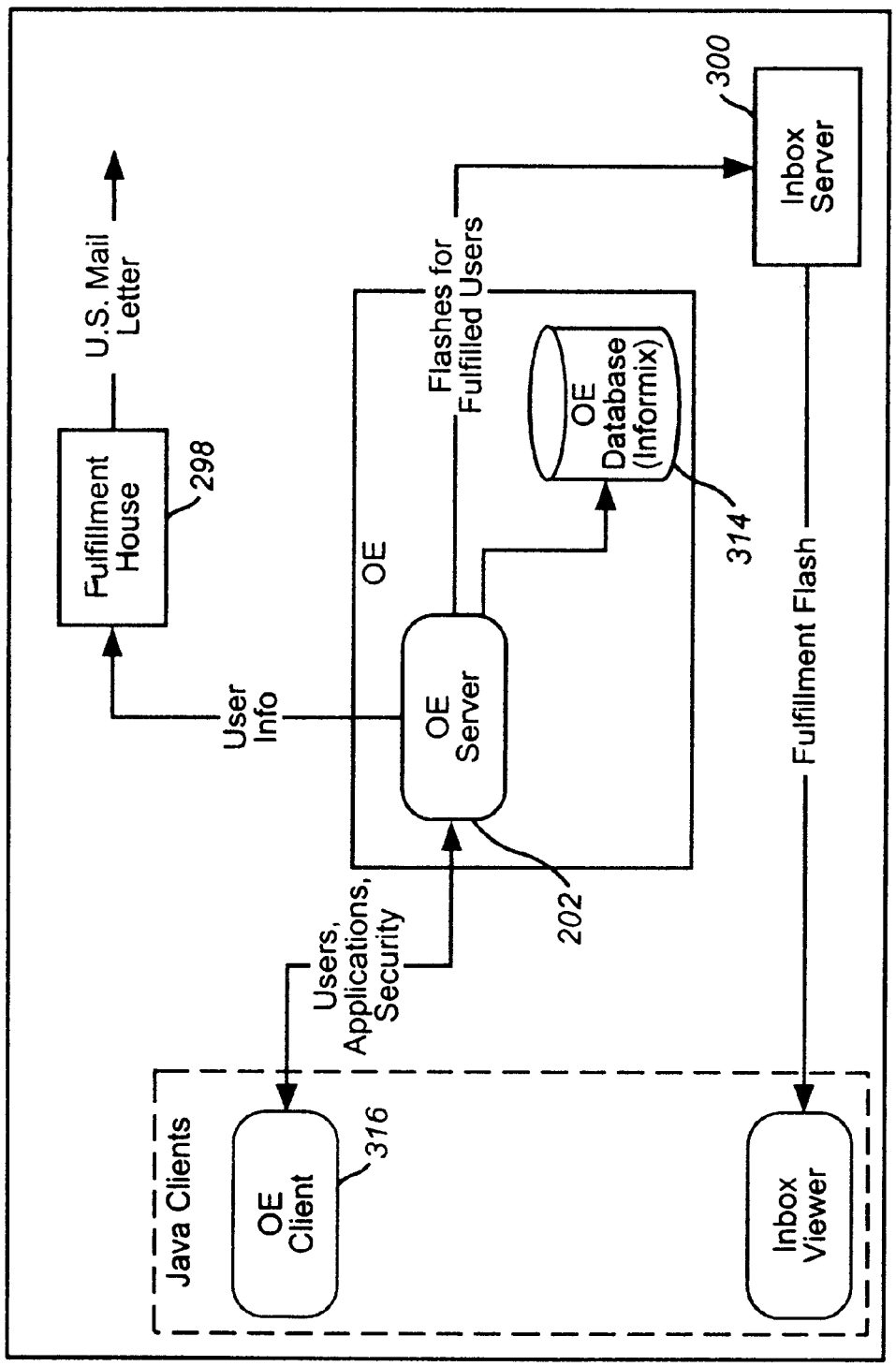
FIG. 14 is a diagram illustrating data flow interface with the fulfillment house in the system of the present invention.

FIG. 14 is a diagram illustrating data flow interface with the fulfillment house in the system of the present invention. Generally, customers are added by Order Entry, via StarOE client program 316. A fulfillment process typically sends information on new customers to the fulfillment house 298 on a nightly basis and also sends a news message comprising welcome letters to each new customer via the Inbox 300. If a new application is added to an existing customer then only a message is sent to the customer via the Inbox 300.

The fulfillment kit comprises a welcome letter and an inbox message. The fulfillment process in the StarOE server 202 typically runs on a daily basis. The information needed for the fulfillment process is generally stored in a database 314, Informix for example, in table forms. Such tables may include a user, configuration, and enterprise user application tables. The information or data is retrieved, configured and computed from the tables and put into a temporary fulfillment table which is used for the collection of the fulfillment information. From the fulfillment table the process creates the inbox letters and records for the fulfillment file. The enterprise user application table usually includes the status of whether the requested applications have been fulfilled. The fulfillment file is transferred, using file transfer protocol (FTP), for example, to the fulfillment group 298 for creation of the welcome letters.

FIG. 8 illustrates an example of a welcome letter 80. The welcome letter 80, which is in a language that the customer requested, comprises the customer's id and password, URLs pointing to a language specific Web page where a customer may typically start up the system of the present invention which the customer has ordered.

StarOE interface to StarWRS

Figure 15:
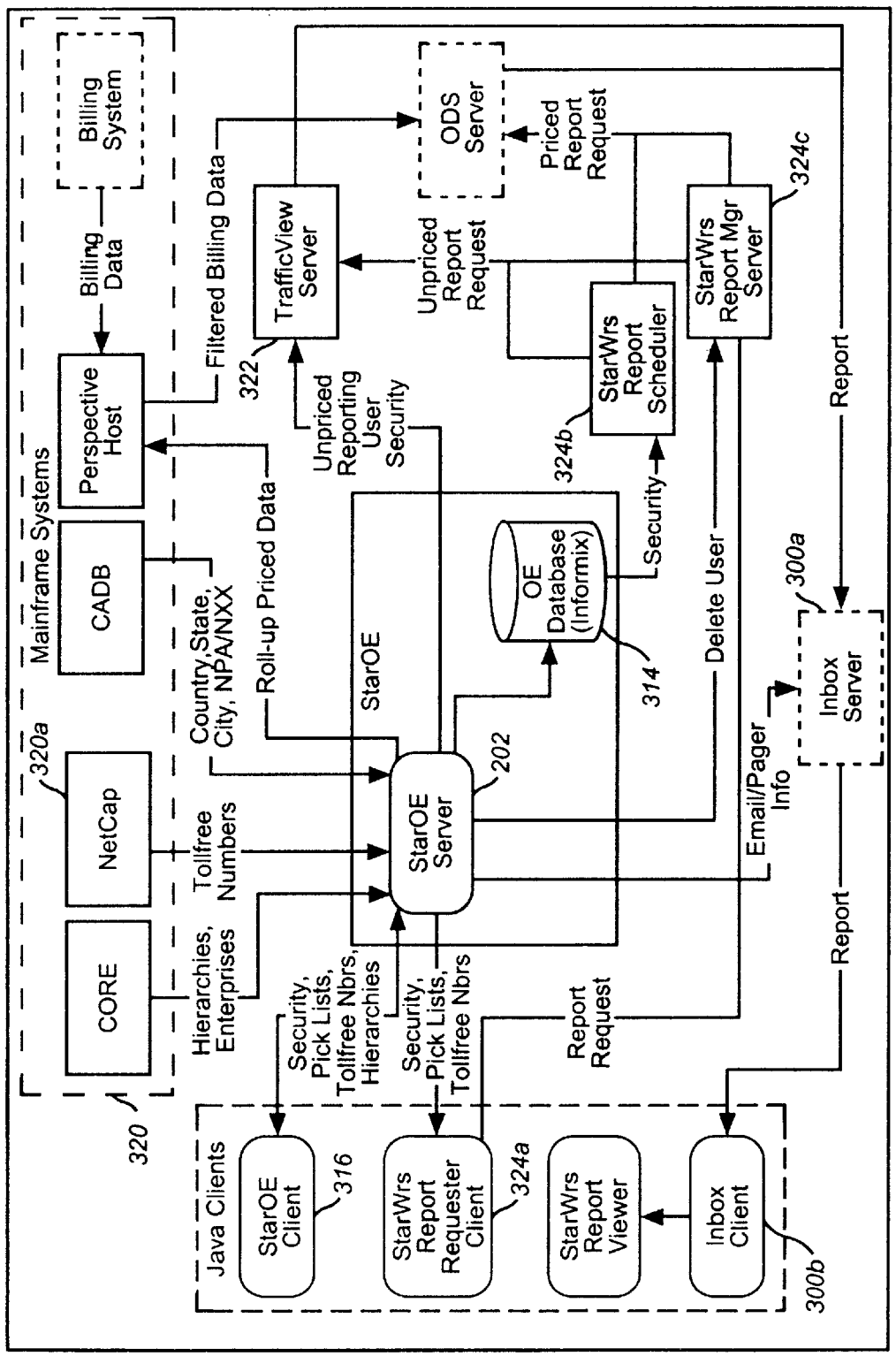
FIG. 15 is a diagram illustrating data flow interface with the Reporting application.

FIG. 15 is a diagram illustrating data flow interface with the Reporting application. The Reporting application is one of the applications available as part of the integrated suite of network applications. A detailed description of the Reporting application can be found in the copending U.S. patent application Ser. No. 09/159,409. FIG. 15. shows StarOE server's interface to various systems in order to provide the Reporting application the appropriate information for producing reports. The reconciliation process generally loads data, such as the toll free hierarchies and pick list information in the StarOE database from the mainframe systems 320. The data are required to setup the security profile for the Reporting application. The loading may be performed periodically, for example, on a nightly basis.

The StarOE client 316 may modify a customer's Reporting Application security profile and add, update, or delete the application and hierarchy access. The hierarchy and security are stored in StarOE database 314.

When a customer modifies the customer's Reporting Application security profile, a select set of data are sent to appropriate servers for real time processing. For example, if the modified security profile includes Un-priced Reports, then the records in the security profile with these reports are sent in realtime to the Traffic View Server 322, such that the Traffic View Server 322 may begin collecting data as soon as the customer makes the modification.

A Reporting application's client program, report requester 324a as well as the servers 324b, 324c also retrieves a customer's profile for reporting purposes. For example, a report scheduler 324b, a part of the reporting servers, verifies via a direct connection with the StarOE database 314, the customer's access level to the hierarchy before scheduling report requests. The Inbox server 300a also requests paging and e-mail information from StarOE server 202 for optional report notifications.

StarOE Interface to TFNM

Figure 16:
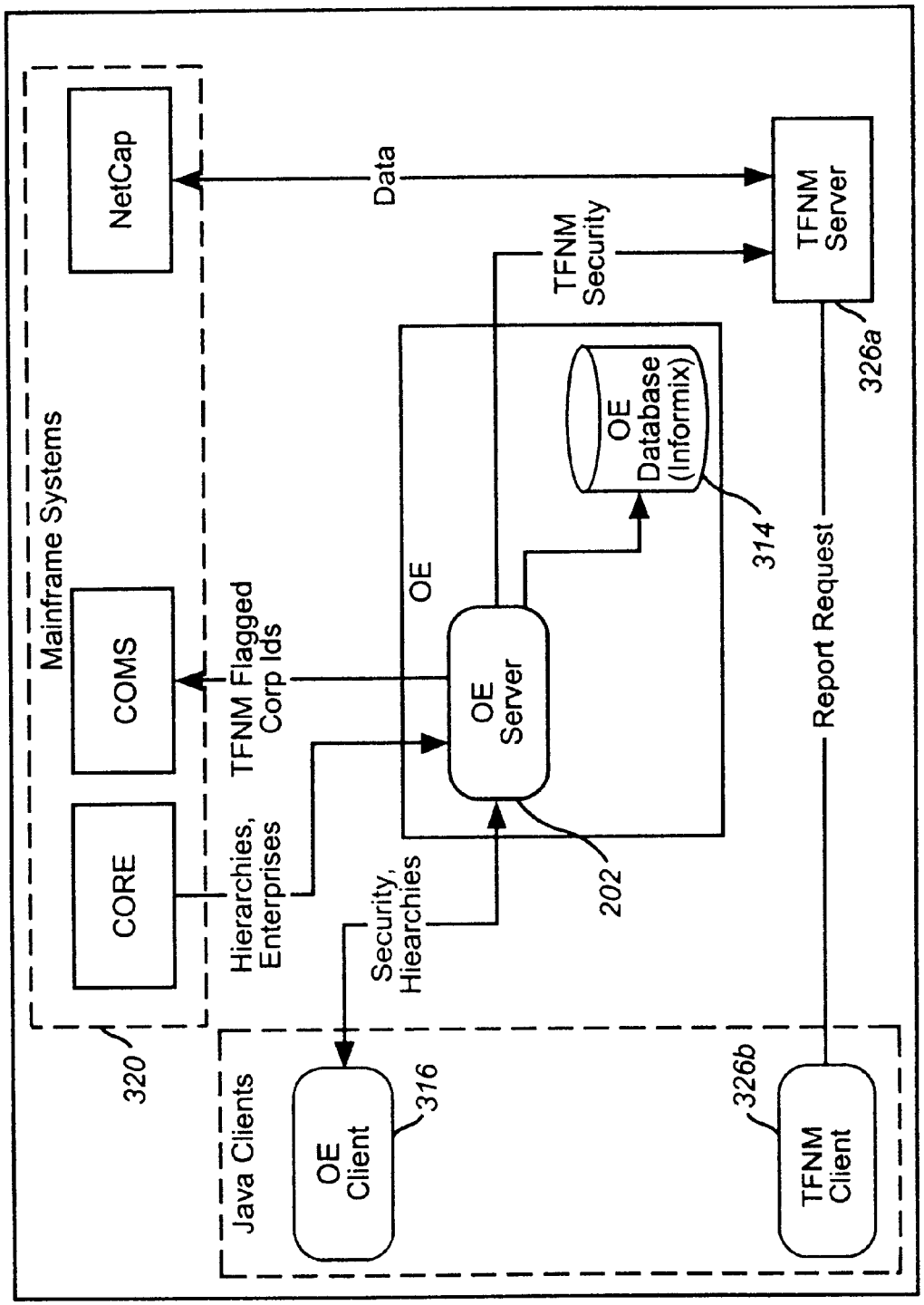
FIG. 16 is a diagram illustrating data flow interface with the Toll Free Network Manager application.

FIG. 16 is a diagram illustrating the data flow interface with the Toll Free Network Manager application. The Toll Free Network Manager is one of the applications available as part of the integrated suite of network applications. A detailed description of the Toll Free Network Manager application can be found in the co-pending U.S. patent application Ser. No. 09/159,702. FIG. 16 shows StarOE server's interface to various systems in order to provide the Toll Free Network Manager application the appropriate information toll free servicing. The data hierarchies necessary for the Toll Free Network Manager are retrieved by the reconciliation process via FTP nightly, for example, from the mainframe system 320 and stored in the StarOE database 314. The data hierarchies retrieved are used to setup the security profile for the Toll Free Network Manager application 326a, 326b. Information setup in the security profile are sent to the mainframe systems 320 by the StarOE server 202. For example, the corp ids that are setup at a global level in StarOE database 314 for use by the Toll Free Network Manager application represent participants of the TollFree Network Manager and are flagged as such in the mainframe system when the information is received. Therefore, upon receiving the ids the mainframe system 320, for any reason, may not delete these corp ids while they are flagged. Additionally, the Toll Free Network Manager server 326a sends requests to the StarOE server 314 to get a Toll Free Network Manager customer's security. This is done by formulating a get user security message in a transaction request as described in reference to FIG. 13.

StarOE Interface to Broadband

Figure 17:
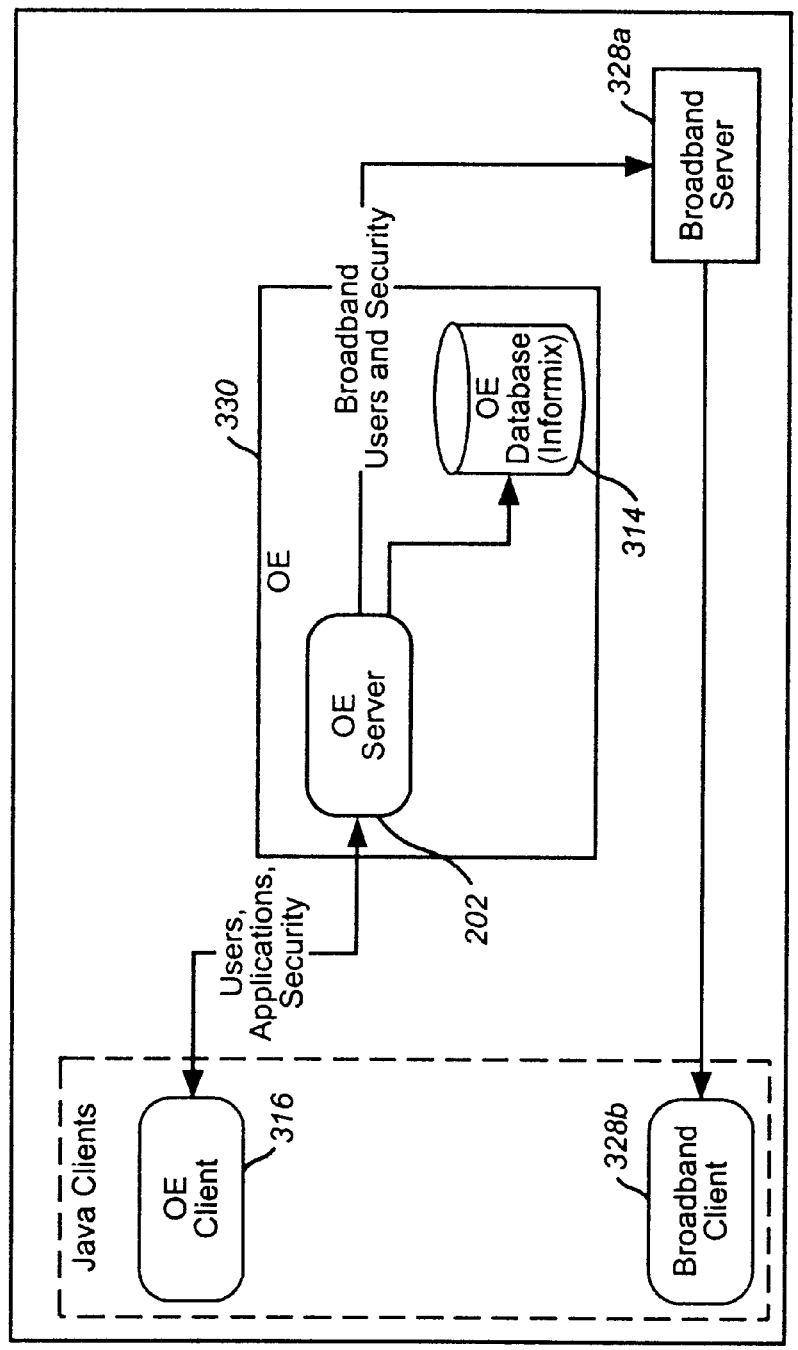
FIG. 17 is a diagram illustrating data flow interface with the Broadband application.

FIG. 17 is a diagram illustrating data flow interface with the Broadband application. The Broadband is one of the applications available as part of the integrated suite of network applications. A detailed description of the Broadband application can be found in the co-pending U.S. patent application Ser. No. 09/159,407. FIG. 17 shows the StarOE server's interface to various systems in order to provide the Broadband application the appropriate information for broadband servicing. Customer's user and security profile for the Broadband application is added by Order Entry 330. When a Broadband customer's profile is added, changed, or deleted, the Broadband server 328a needs to be notified of the operation so that the server 328a can either begin or stop collecting data for the specific customer's bill ids. Typically the notification is done by a message in the form of a file. The file is typically placed in a known directory and is transferred to the Broadband server 328a via FTP process. The file transferred generally includes all the current Broadband customers with their bill ids.

While the invention has been particularly shown and described with respect to preferred embodiments thereof, it will be understood by those skilled in the art that the foregoing and other changes in form and details may be made therein without departing from the spirit and scope of the invention. More specifically, the system administrative and order entry system described may apply to any generic applications available via the Web and is not limited to the telecommunications applications explained above for exemplary purposes.

What is claimed is:

1. A Web-based centralized authentication and entitlement administration system for enabling a customer to enter orders over the Internet from a client terminal for one or more application services available at an enterprise, the system comprising:

a client browser application located at the client terminal and providing an integrated interface to the one or more application services, the client browser application interacting with the customer;

an order entry server located at the enterprise, the order entry server for communicating over the Internet with the client browser application to provide authentication and entitlement information associated with the customer, wherein the client browser application obtains the authentication and entitlement information associated with the customer and applies the authentication information in validating the customer before enabling the customer to access the enterprise, the client browser application enabling the customer to access only those application services to which the customer is entitled; and an order entry object, initiated by the client browser application, for enabling presentation of entry options for the customer, the entry options including adding a new order, modifying an existing order, and canceling an order, the order entry object presenting the entry options in a tree format, where a first tree level represents an enterprise, a second tree level represents users under the enterprise, and a third tree level represents application services accessible by the users, the order entry object further communicating customer entry of a specific entry option to the order entry server, whereby the customer is enabled via the integrated interface to enter new orders, modify existing orders, and cancel orders for the application services within the customer entitlements.

2. The system as claimed in claim 1, the method further comprises:

a customer profile database for storing the authentication and entitlement information.

3. The system as claimed in claim 2, wherein the order entry server further comprises a fulfillment process for retrieving from customer profile information associated with newly added customers, and wherein the fulfillment process notifies and electronically transmits the information to a fulfillment house responsible for sending subscription packages to new customers.

4. The system as claimed in claim 3, wherein the fulfillment process runs periodically on a predefined time basis.

5. The system as claimed in claim 3, wherein the fulfillment process further sends the subscription packages with a welcome message to a message center created for and associated with the new customers.

6. The system as claimed in claim 2, wherein the order entry server further comprises a reconciliation process for updating and synchronizing data stored in the customer profile database with data stored in mainframe systems.

7. The system as claimed in claim 6, wherein the reconciliation process runs periodically on a predefined time basis.

8. The system as claimed in claim 6, wherein the reconciliation process further updates and synchronizes data in the customer profile database with data stored in servers associated with the application services.

9. The system as claimed in claim 8, wherein the reconciliation process updates and synchronizes the data in real time, wherein the application services use real time data when processing requests by the customer.

10. The system as claimed in claim 2, wherein the order entry server further comprises a billing process for automatically directing customer bills to a billing stream specified in the customer profile database.

11. The system as claimed in claim 1, wherein the order entry object further comprises a first object for communicating new orders, modified orders, and canceled orders in response to customer entry of a specific option, and wherein the order entry server further comprises a second object for accepting and storing the customer entries.

12. The system as claimed in claim 11, wherein the first object for communicating comprises a plurality of messaging classes, the plurality of messaging classes including:

base message classes for encapsulating standards required for communicating between the client browser application and the order entry server;

request and response classes derived from the base message classes for handling a plurality of request and response transactions communicated between the client browser application and the order entry server, the request and response transactions including the new orders, modified orders, and canceled orders associated with the customer selection of a specific option.

13. The system as claimed in claim 1, wherein the order entry object includes an entry application downloaded from the enterprise, the entry application running in its own window frame.

14. The system as claimed in claim 1, wherein the second tree level further comprises a new user node for enabling addition of a new user under the enterprise.

15. The system as claimed in claim 1, wherein the users are associated with a corp, and the application services include toll free numbers subscribed to by the corp.

16. The system as claimed in claim 1, wherein the order entry object enables modification of entries associated with a node in the tree when the node is selected.

17. The system as claimed in claim 16, wherein the modification of entries includes modifying reporting options for toll free numbers.

18. The system as claimed in claim 16, wherein the modification of entries includes modifying user access levels associated with the application services.

19. The system as claimed in claim 16, wherein the modification of entries includes modifying target billing streams where customer bills are transmitted.

20. A method of providing Internet enabled centralized authentication and entitlement administration services for enabling a customer to enter orders over the Internet from a client workstation for one or more application services available from an enterprise, the method comprising:

presenting to a customer a client browser application having an integrated interface to the one or more application services;

communicating authentication requests and responses over the Internet to an order entry server located at the enterprise;

authenticating the customer at the client workstation with authentication information received from the order entry server;

enabling the customer to access predetermined application services according to an entitlement response received from the order entry server;

enabling presentation of entry options for the customer in a tree format, a first tree level representing an enterprise, a second tree level representing users under the enterprise, and a third tree level representing application services accessible by the users, the entry options further including adding a new order, modifying an existing order, and canceling an order; and communicating customer selected entry options to the order entry server, wherein the customer is enabled via the integrated interface to enter new orders, modify existing orders, and cancel orders for the application services within the customer entitlements.

21. The method according to claim 20, wherein the method further comprises:

storing authentication and entitlement information in a customer profile database at the enterprise.

22. The method according to claim 21, wherein the method further comprises updating and synchronizing the customer profile database with data in at least one mainframe system providing an application service to the customer.

23. The method according to claim 21, wherein the method further comprises directing customer bills to billing streams specified in the customer profile database.

24. The method according to claim 20, wherein the method further comprises transmitting data associated with a customer selected entry option to a server associated with a respective application service.

25. The method according to claim 20, wherein the method further comprises presenting entry entitlements to the customer in a tree format.

* * * * *